(12) United States Patent
Satish Padmanabhan et al.

(10) Patent No.: US 12,045,373 B2
(45) Date of Patent: Jul. 23, 2024

(54) MACHINE LEARNING AND RULE-BASED IDENTIFICATION, ANONYMIZATION, AND DE-ANONYMIZATION OF SENSITIVE STRUCTURED AND UNSTRUCTURED DATA

(71) Applicant: ACCENTURE GLOBAL SOLUTIONS LIMITED, Dublin (IE)

(72) Inventors: Aishwarya Satish Padmanabhan, Santa Clara, CA (US); Anshuma Chandak, San Jose, CA (US); Emmanuel Munguia Tapia, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 308 days.

(21) Appl. No.: 17/555,224

(22) Filed: Dec. 17, 2021

(65) Prior Publication Data
US 2023/0195933 A1    Jun. 22, 2023

(51) Int. Cl.
*G06F 21/62*    (2013.01)
*G06F 40/166*    (2020.01)
*G06F 40/263*    (2020.01)
*G06F 40/295*    (2020.01)

(52) U.S. Cl.
CPC ........ *G06F 21/6254* (2013.01); *G06F 40/166* (2020.01); *G06F 40/263* (2020.01); *G06F 40/295* (2020.01)

(58) Field of Classification Search
CPC ............ G06F 21/6254; G06F 21/6245; G06F 40/166; G06F 40/263; G06F 40/295; G06F 40/279
See application file for complete search history.

(56) References Cited

U.S. PATENT DOCUMENTS

| | | | |
|---|---|---|---|
| 2019/0258710 A1* | 8/2019 | Biyani | G06F 40/295 |
| 2019/0259380 A1* | 8/2019 | Biyani | G10L 15/22 |
| 2021/0157975 A1* | 5/2021 | Gelosi | G06F 40/166 |
| 2021/0383798 A1* | 12/2021 | Zhang | G06F 16/3329 |

OTHER PUBLICATIONS

"Presidio Analyzer", https://microsoft.github.io/presidio/analyzer/; Downloaded—Dec. 17, 2021, (4 pages).

(Continued)

*Primary Examiner* — Khoi V Le
(74) *Attorney, Agent, or Firm* — Mannava & Kang, P.C.

(57) ABSTRACT

In some examples, machine learning and rule-based identification, anonymization, and de-anonymization of sensitive structured and unstructured data may include receiving input data that is to be masked, and determining, for the input data, at least one type '1 of entity extraction from a plurality of types of entity extractions to be performed on the input data. The at least one determined type of entity extraction may be performed on the input data, and at least one entity may be extracted from the input data. At least one replacement strategy may be determined from a plurality of replacement strategies for the at least one extracted entity. Further, the at least one determined replacement strategy may be applied to the at least one extracted entity to generate masked data.

20 Claims, 27 Drawing Sheets

(56) References Cited

OTHER PUBLICATIONS

"Detect Personally Identifiable Information", Amazon Web Services, (PII) https://docs.aws.amazon.com/comprehend/latest/dg/how-pii.html; 2022, (5 pages).
"High accuracy Data Anonymization", https://amnesia.openaire.eu/index.html; Downloaded—Dec. 17, 2021, (1 page).

* cited by examiner

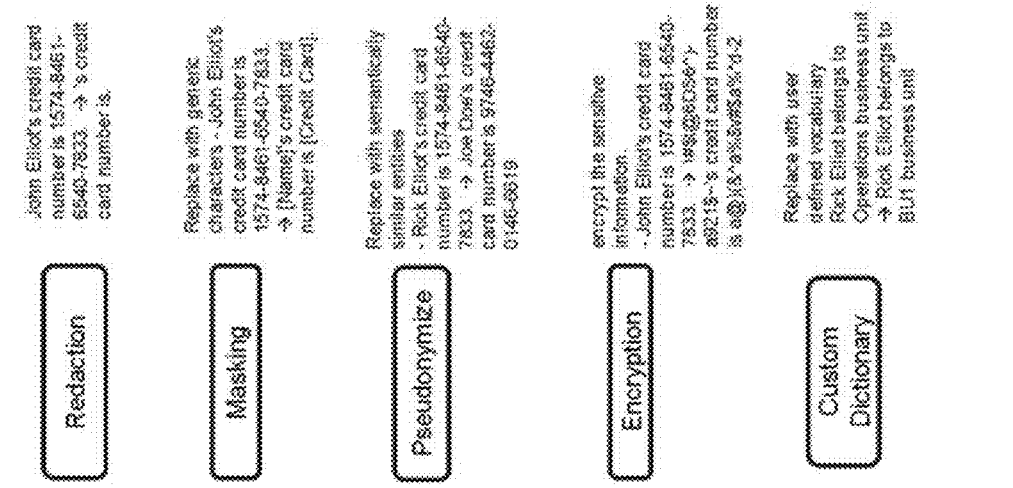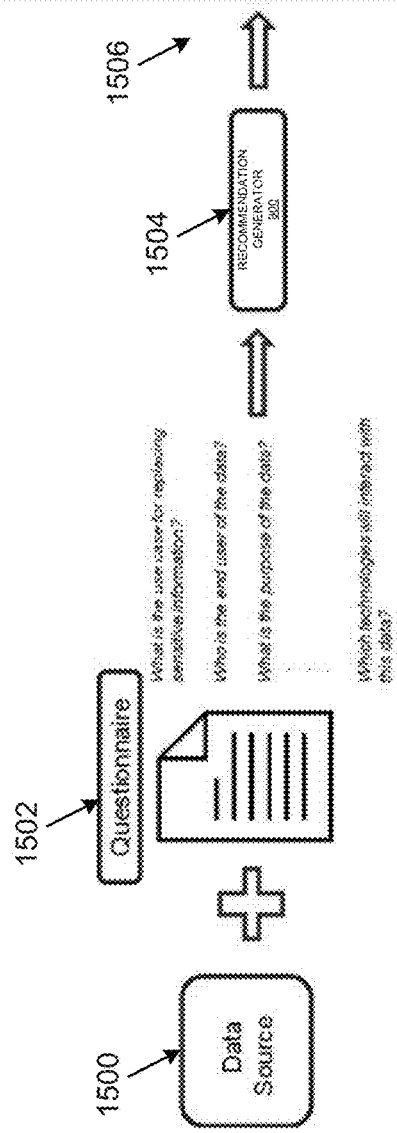
FIG. 15

2500

```
┌─────────────────────────────────────────────────────────┐
│         RECEIVE INPUT DATA THAT IS TO BE MASKED         │
│                          2502                           │
└─────────────────────────────────────────────────────────┘
                             │
                             ▼
┌─────────────────────────────────────────────────────────┐
│  DETERMINE, FOR THE INPUT DATA, AT LEAST ONE TYPE OF    │
│  ENTITY EXTRACTION FROM A PLURALITY OF TYPES OF ENTITY  │
│    EXTRACTIONS TO BE PERFORMED ON THE INPUT DATA        │
│                          2504                           │
└─────────────────────────────────────────────────────────┘
                             │
                             ▼
┌─────────────────────────────────────────────────────────┐
│  PERFORMING, BASED ON THE AT LEAST ONE DETERMINED TYPE  │
│   OF ENTITY EXTRACTION, THE AT LEAST ONE DETERMINED     │
│      TYPE OF ENTITY EXTRACTION ON THE INPUT DATA        │
│                          2506                           │
└─────────────────────────────────────────────────────────┘
                             │
                             ▼
┌─────────────────────────────────────────────────────────┐
│  EXTRACT, BASED ON THE PERFORMANCE OF THE AT LEAST ONE  │
│ DETERMINED TYPE OF ENTITY EXTRACTION ON THE INPUT DATA, │
│         AT LEAST ONE ENTITY FROM THE INPUT DATA         │
│                          2508                           │
└─────────────────────────────────────────────────────────┘
                             │
                             ▼
┌─────────────────────────────────────────────────────────┐
│  DETERMINE, FOR THE AT LEAST ONE EXTRACTED ENTITY, AT   │
│  LEAST ONE REPLACEMENT STRATEGY FROM A PLURALITY OF     │
│               REPLACEMENT STRATEGIES                    │
│                          2510                           │
└─────────────────────────────────────────────────────────┘
                             │
                             ▼
┌─────────────────────────────────────────────────────────┐
│  APPLY, TO THE AT LEAST ONE EXTRACTED ENTITY, THE AT    │
│       LEAST ONE DETERMINED REPLACEMENT STRATEGY         │
│                          2512                           │
└─────────────────────────────────────────────────────────┘
                             │
                             ▼
┌─────────────────────────────────────────────────────────┐
│   GENERATE, BASED ON THE APPLICATION OF THE AT LEAST    │
│   ONE DETERMINED REPLACEMENT STRATEGY TO THE AT LEAST   │
│              ONE EXTRACTED ENTITY, MASKED DATA          │
│                          2514                           │
└─────────────────────────────────────────────────────────┘
```

*FIG. 25*

MACHINE LEARNING AND RULE-BASED IDENTIFICATION, ANONYMIZATION, AND DE-ANONYMIZATION OF SENSITIVE STRUCTURED AND UNSTRUCTURED DATA

BACKGROUND

In some cases, data may need to be modified to remove or otherwise obscure personal and confidential information. One such technique for the removal of personal and confidential information may include data masking. With respect to data masking, the masked data may be used for various purposes without disclosing the personal and confidential information.

BRIEF DESCRIPTION OF DRAWINGS

Features of the present disclosure are illustrated by way of example and not limited in the following figure(s), in which like numerals indicate like elements, in which:

FIG. 15 illustrates recommendation of replacement strategies to illustrate operation of the machine learning and rule-based identification, anonymization, and de-anonymization of sensitive structured and unstructured data apparatus of FIG. 1 in accordance with an example of the present disclosure;

FIG. 25 illustrates a flowchart of an example method for machine learning and rule-based identification, anonymization, and de-anonymization of sensitive structured and unstructured data in accordance with an example of the present disclosure.

DETAILED DESCRIPTION

Figure 1:
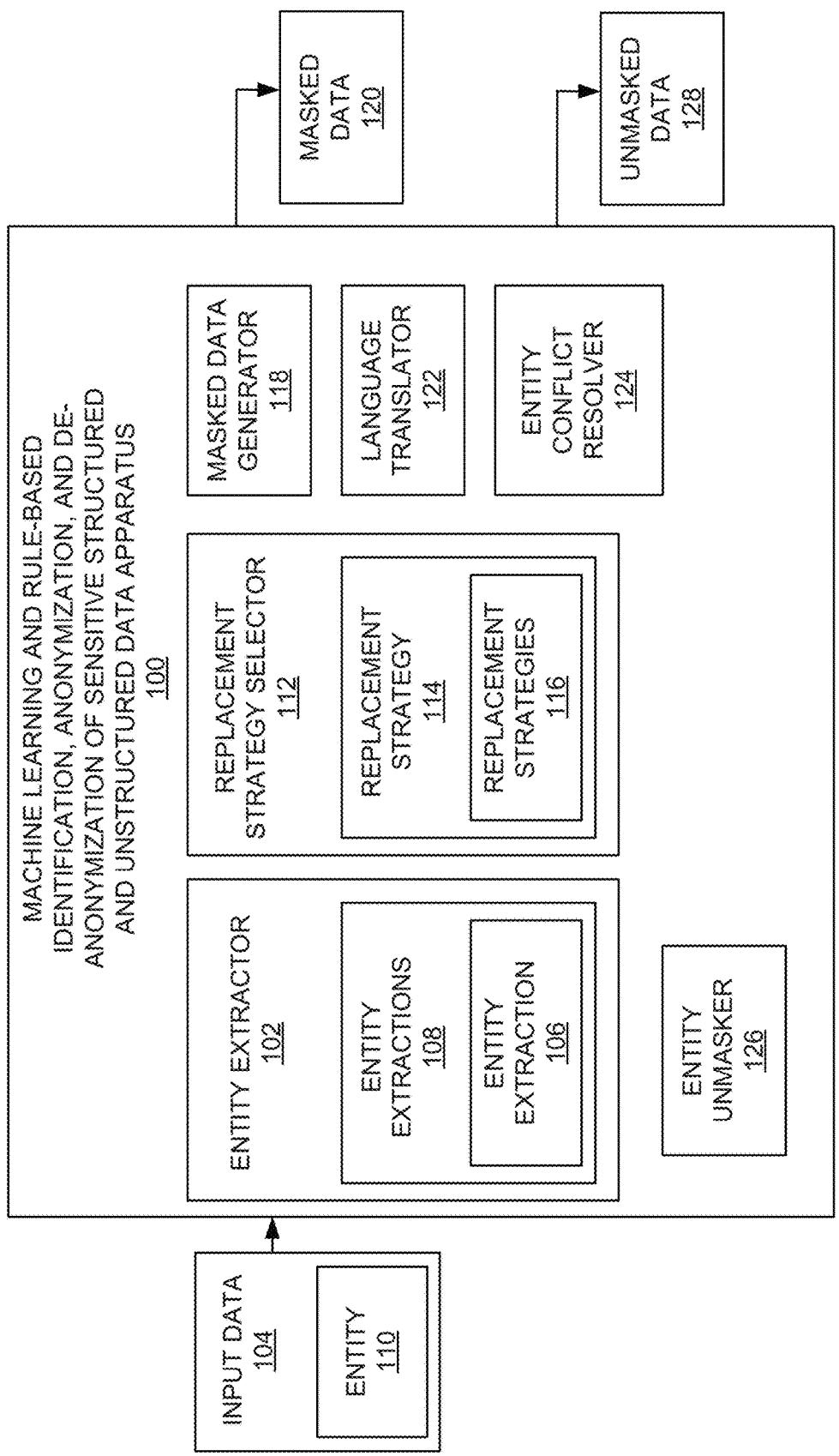
FIG. 1 illustrates a layout of a machine learning and rule-based identification, anonymization, and de-anonymization of sensitive structured and unstructured data apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Machine learning and rule-based identification, anonymization, and de-anonymization of sensitive structured and unstructured data apparatuses, methods for machine learning and rule-based identification, anonymization, and de-anonymization of sensitive structured and unstructured data, and non-transitory computer readable media having stored thereon machine readable instructions to provide machine learning and rule-based identification, anonymization, and de-anonymization of sensitive structured and unstructured data are disclosed herein. The apparatuses, methods, and non-transitory computer readable media disclosed herein provide for users to upload images or text files. Using optical character recognition for image to text conversion, and machine translation for multi-language text, the apparatuses, methods, and non-transitory computer readable media disclosed herein provide for entity extraction for text using the selected search strategies including pre-built and custom regular expressions, named entity recognition, dictionary based entity search outside of language vocabulary, and custom blacklist words and phrases. Once the sensitive data extraction is complete, a user may be allowed to confirm and deselect extracted entities followed by selection of a masking strategy such as redact, hash, and pseudonymized the sensitive information. The apparatuses, methods, and non-transitory computer readable media disclosed herein provide for masking of structured database fields with specific formatting strings. The apparatuses, methods, and non-transitory computer readable media disclosed herein may be configured to unmask certain values based on configurations set by a user. Further, the apparatuses, methods, and non-transitory computer readable media disclosed herein may include artificial intelligence based techniques and features that allow users to customize fields based on training data.

With respect to data masking generally, for applications that require large amounts of data for machine learning and artificial intelligence models, it is technically challenging to obtain the data, for example, from a user without extensive legal reviews. Further, it is technically challenging to share personal or sensitive data due to privacy and security concerns.

The apparatuses, methods, and non-transitory computer readable media address at least the aforementioned technical challenges, and may be implemented in various industries and scenarios, such as, for example, data sharing with development and testing teams, preserving of user data after contract is over for artificial intelligence models, open-source datasets to share with community; providing for processing of data via cloud application programming interfaces (APIs), and creation of responsible artificial intelligence data models.

With respect to data sharing with development and testing teams, certain users may require sharing of sensitive data with their technology teams or third-party teams for development and testing of software. The apparatuses, methods; and non-transitory computer readable media disclosed herein may provide for masking of sensitive data before providing the teams with the data.

With respect to preserving of user data after a contract is over for artificial intelligence models, in some cases, user contracts require all the data provided to be deleted after the contract ends. The primary reason for this is because the data may contain some sensitive information. The apparatuses, methods, and non-transitory computer readable media disclosed herein provide for masking of data so that the rest of the data can be retained, which may be useful to train artificial intelligence models across various domains.

With respect to open-source datasets to share with community, the apparatuses, methods, and non-transitory computer readable media disclosed herein may provide for collecting and storing data which does not have sensitive information, which may be useful to consolidate as an asset and make it publicly available to the artificial intelligence community for training artificial intelligence models.

With respect to allowing processing of data via cloud APIs, there are many privacy concerns on uploading data to the cloud servers or using cloud-based APIs on client sensitive data. The apparatuses, methods, and non-transitory computer readable media disclosed herein may provide for masking of such data.

With respect to creation of responsible artificial intelligence data models, responsible artificial intelligence may pertain to how historical data can heavily cause artificial intelligence models to be biased and not generalize well. The apparatuses, methods, and non-transitory computer readable media disclosed herein may provide for masking of sensitive information, for example, gender and location, to help remove some underlying biases that may exist in the data.

The apparatuses, methods, and non-transitory computer readable media disclosed herein further address at least the aforementioned technical challenges by providing for data masking by removing personal and confidential information from structured databases and unstructured data sources for data sharing with development and testing teams, for preserving of user data after a contract is over for artificial intelligence models, for sharing of open-source datasets with a community, for processing of data via cloud application programming interfaces, and for creation of responsible artificial intelligence data models (e.g., models that do not have personal information). The data masking may be particularly important because users may be hesitant when it comes to sharing of personal or sensitive data due to privacy and security concerns. The apparatuses, methods, and non-transitory computer readable media disclosed herein provide for enablement of all of the above use cases by masking and redacting not only generic sensitive information but also customizing entities and blacklist terms specific for each application and user. By configuring various search strategies for entity extraction and masking techniques, a user may utilize the apparatuses, methods, and non-transitory computer readable media disclosed herein to anonymize sensitive data and provide masked data for the above use cases. The apparatuses, methods, and non-transitory computer readable media disclosed herein provide for anonymizing of sensitive data in unstructured natural language data, as well as database fields and structured data as well for various applications, Yet further, the apparatuses, methods, and non-transitory computer readable media disclosed herein may include a modular structure to enable integration of required features into existing application pipelines.

The apparatuses, methods, and non-transitory computer readable media disclosed herein provide for customization, recommendation of selection strategy, masked value persistence, dictionary lookup for domain knowledge, multi-language support and continuous learning integration.

The apparatuses, methods, and non-transitory computer readable media disclosed herein provide for anonymizing of unstructured and structured data and database fields (e.g., including formats of input data such as image, pdf, email, Excel™ spreadsheet, databases, etc.).

The apparatuses, methods, and non-transitory computer readable media disclosed herein provide for a continuous learning framework that includes a human-in-the-loop to monitor and review the entities extracted, and feed it back to the system.

The apparatuses, methods, and non-transitory computer readable media disclosed herein provide for anonymizing of data on original documents (e.g., upload pdf document, extraction of entities, pseudonymize, go to the document, generate image, and overlap the original look).

The apparatuses, methods, and non-transitory computer readable media disclosed herein provide for recommendations associated with data masking.

The apparatuses, methods, and non-transitory computer readable media disclosed herein provide a domain specific dictionary reflecting domain specific knowledge, for example, a mechanism to customize masking of user specific fields and data (artificial intelligence/machine learning approaches).

The apparatuses, methods, and non-transitory computer readable media disclosed herein provide for support of multiple languages.

The apparatuses, methods, and non-transitory computer readable media disclosed herein provide for maintenance of consistency of masked entities within a masking dataset.

The apparatuses, methods, and non-transitory computer readable media disclosed herein provide for leveraging of context for entity conflict resolution.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example machine learning and rule-based identification, anonymization, and de-anonymization of sensitive structured and unstructured data apparatus (hereinafter also referred to as "apparatus 100").

Referring to FIG. 1, the apparatus 100 may include an entity extractor 102 that is executed by at least one hardware processor (e.g., the hardware processor 2402 of FIG. 4, and/or the hardware processor 2604 of FIG. 26) to receive input data 104 that is to be masked, and determine, for the input data 104, at least one type of entity extraction 106 from a plurality of types of entity extractions 108 to be performed on the input data 104, The entity extractor 102 may perform, based on the at least one determined type of entity extraction 106, the at least one determined type of entity extraction 106 on the input data 104. The entity extractor 102 may extract, based on the performance of the at least one determined type of entity extraction 106 on the input data 104, at least one entity 110 from the input data 104.

According to examples disclosed herein, the entity extractor 102 may determine, for the input data 104, at least one type of entity extraction 106 that includes at least two of a regular expression based entity extraction, a language dictionary based entity extraction, a named entity recognition based entity extraction, a custom blacklist based entity extraction, or a machine learning model based entity extraction.

A replacement strategy selector 112 that is executed by at least one hardware processor (e.g., the hardware processor 2402 of FIG. 4, and/or the hardware processor 2604 of FIG. 26) may determine, for the at least one extracted entity 110, at least one replacement strategy 114 from a plurality of replacement strategies 116. The replacement strategy selector 112 may apply, to the at least one extracted entity 110, the at least one determined replacement strategy 114.

According to examples disclosed herein, the replacement strategy selector 112 may determine, for the at least one extracted entity, at least one replacement strategy 114 from the plurality of replacement strategies 116 by determining, for the at least one extracted entity 110, at least one replacement strategy 114 from the plurality of replacement strategies 116 that include at least two of redaction, masking, pseudonymization, or encryption.

A masked data generator 118 that is executed by at least one hardware processor (e.g., the hardware processor 2402 of FIG. 4, and/or the hardware processor 2604 of FIG. 26) may generate, based on the application of the at least one determined replacement strategy 114 to the at least one extracted entity 110, masked data 120. In this regard, the masked data 120 may protect information from accidental and intentional threats by ensuring that sensitive information is not available beyond a production environment. The masked data 120 may also provide for compliance with various data protection laws. For example, a specified protection law such as General Data Protection Regulation may require that organizations practice data minimization, which is that they collect and use data limited to what is necessary for a specific purpose, retain it no longer than necessary, and not make it available to an indefinite number of people. The masked data 120 may also provide for improvement in machine learning performance by ensuring that data is standardized. For example, data may be shared with development and testing teams, with original user data being preserved after a usage contract ends for artificial intelligence models. The masked data 120 may provide open-source datasets to share with a community. The masked data 120 may also allow for processing of data via cloud application programming interfaces. Further, the asked data 120 may be utilized to create responsible artificial intelligence data models. Moreover, the masked data 120 may protect information from accidental and intentional threats and also ensure compliance with policies and requirements.

According to examples disclosed herein, the input data 104 may include a text format and/or an image format.

A language translator 122 that is executed by at least one hardware processor (e.g., the hardware processor 2402 of FIG. 4, and/or the hardware processor 2604 of FIG. 26) may detect a language of the input data 104. The language translator 122 may determine whether the detected language Spanish) is different than a specified language (e.g., English). Based on a determination that the detected language is different than the specified language, the language translator 122 may translate the detected language to the specified language.

An entity conflict resolver 124 that is executed by at least one hardware processor (e.g., the hardware processor 2402 of FIG. 4, and/or the hardware processor 2604 of FIG. 26) may analyze the at least one extracted entity 110 for a conflict with a plurality of labels associated with the at least one extracted entity 110. The entity conflict resolver 124 may generate, based on the analysis of the at least one extracted entity 110, a resolution to the conflict with the plurality of labels associated with the at least one extracted entity 110.

An entity unmasker 126 that is executed by at least one hardware processor (e.g., the hardware processor 2402 of FIG. 4, and/or the hardware processor 2604 of FIG. 26) may receive further input data that is to be unmasked. The entity unmasker 126 may determine, for the further input data, at least one type of entity to unmask from a plurality of types of entities to unmask. Further, the entity unmasker 126 may generate, based on unmasking of the at least one determined type of entity to unmask, unmasked data 128.

Figure 2:
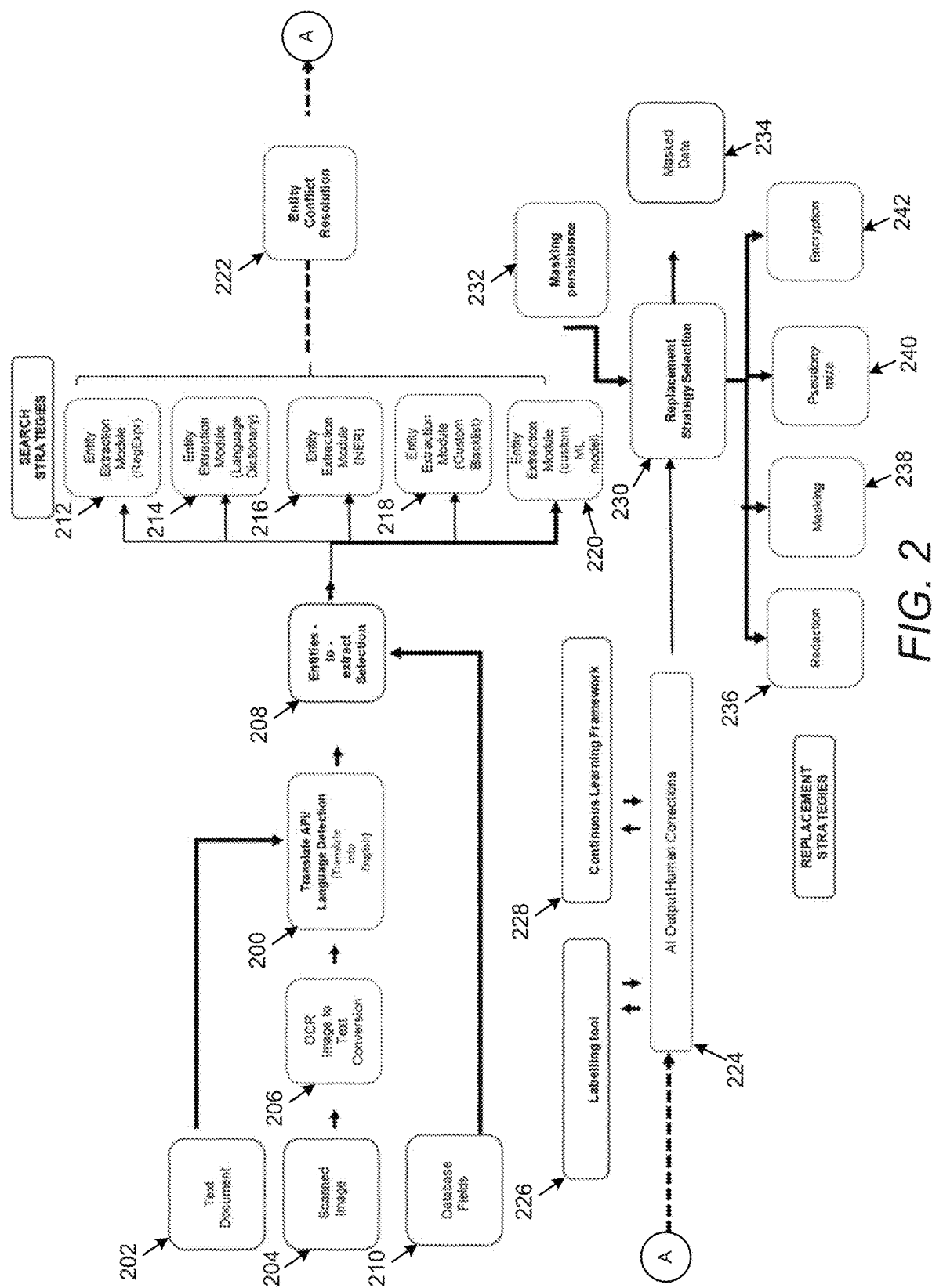
FIG. 2 illustrates a logical flow for masking to illustrate operation of the machine learning and rule-based identification, anonymization, and de-anonymization of sensitive structured and unstructured data apparatus of FIG. 1, in accordance with an example of the present disclosure.

FIG. 2 illustrates a logical flow for masking to illustrate operation of the apparatus 100, in accordance with an example of the present disclosure.

Referring to FIG. 2, with respect to masking, at 200, the language translator 122 may receive the input data 104 that includes either a text document 202 or a scanned image 204 from which text has been extracted at 206.

At 208, the entity extractor 102 may determine, for the input data 104, at least one type of entity extraction 106 (e.g., from 210) that includes a regular expression based entity extraction at 212, a language dictionary based entity extraction at 214, a named entity recognition based entity extraction at 216, a custom blacklist based entity extraction at 218, and/or a machine learning model based entity extraction at 220.

The regular expressions at 212 may be used to identify confidential information in specific formats (e.g., phone numbers, tax IDs, dates, etc.). This may be of two types, generic and user specific.

With respect to dictionary comparison at 214, confidential information may be identified by comparing every word in a text document with a corresponding dictionary in a target language. For example, in English, each word may be compared against the Merriam-Webster dictionary. Any word not found in a dictionary may be potentially considered as confidential information.

With respect to database comparison, words hi a document may be compared against specific databases to identify specific entities in the text. For example, to identify names, the words in a document may be compared against the national names database from the census bureau. Any matching word may be potentially considered to be a name.

With respect to named entity extraction at 216, confidential information may also be identified by applying machine learning and natural language processing libraries for entity extraction. In this manner, entities such as names, addresses, phone numbers, etc., may be identified, Entity extraction algorithms may include algorithms that extract generic entities such as the ones previously mentioned, and those that may be custom built to extract specific entities of interest for users using approaches such as conditional random fields.

Ensemble approaches may include applying two or more of the above-mentioned approaches and merging the independent outputs with a probabilistic method to increase the quality of the masking.

At 222, the entity conflict resolver 124 may analyze the at least one extracted entity 110 for a conflict with a plurality of labels associated with the at least one extracted entity 110.

At 224, artificial intelligence output and human corrections may be performed based on input from a labeling tool 226 and a continuous learning framework 228.

The replacement strategy selector 112 at 230 may determine, for the at least one extracted entity 110, at least one replacement strategy 114 from a plurality of replacement strategies 116 (e.g., redaction at 236, masking at 238, pseudonymization at 240, and encryption at 242). The replacement strategy selector 112 may apply, to the at least one extracted entity 110, the at least one determined replacement strategy 114.

Figure 3:
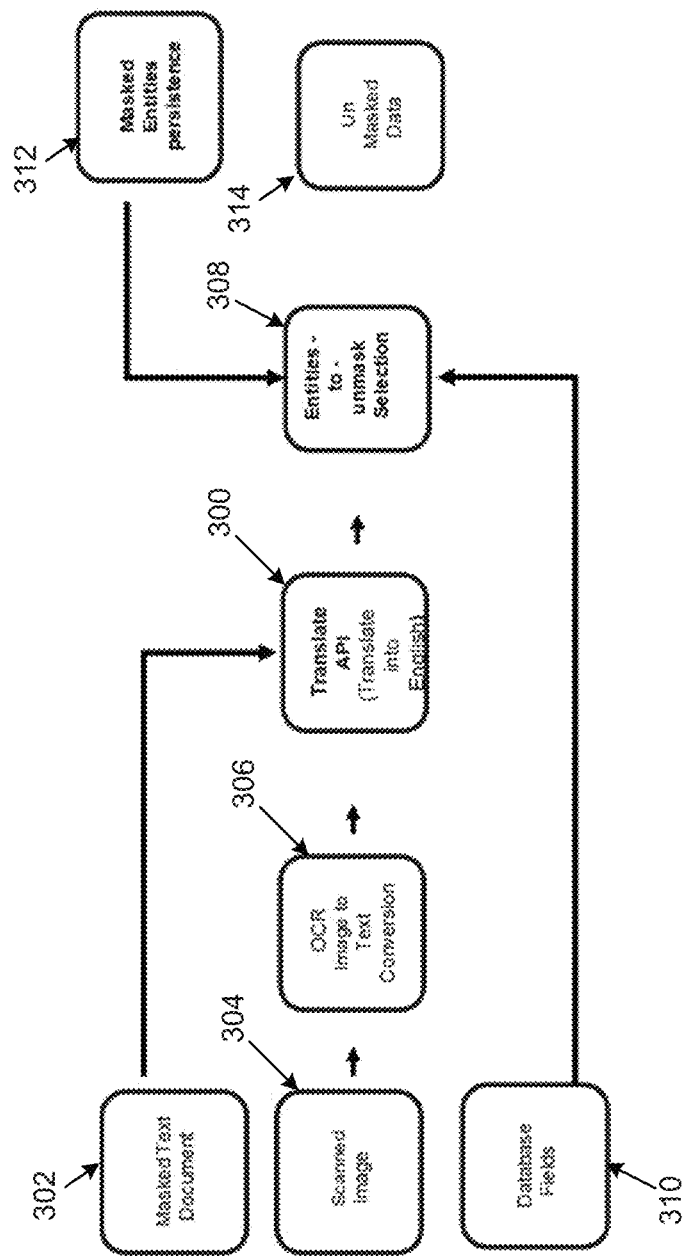
FIG. 3 illustrates a logical flow for unmasking to illustrate operation of the machine learning and rule-based identification, anonymization, and de-anonymization of sensitive structured and unstructured data apparatus of FIG. 1, in accordance with an example of the present disclosure.

The masked data generator 118 at 232 may generate, based on the application of the at least one determined replacement strategy 114 to the at least one extracted entity 110, the masked data 120 at 234, FIG. 3 illustrates a logical flow for unmasking to illustrate operation of the apparatus 100, in accordance with an example of the present disclosure.

Referring to FIG. 3, with respect to unmasking, at 300, the language translator 122 may receive either a text document 302 or a scanned image 304 (e.g., further input data) from which text has been extracted at 306. The entity unmasker 126 at 312 may determine, for the further input data, at least one type of entity to unmask (e.g., at 308) from a plurality of types of entities (e.g., from 310) to unmask. Further, the entity unmasker 126 may generate, based on unmasking of the at least one determined type of entity to unmask, unmasked data 128 at 314.

Figure 4:
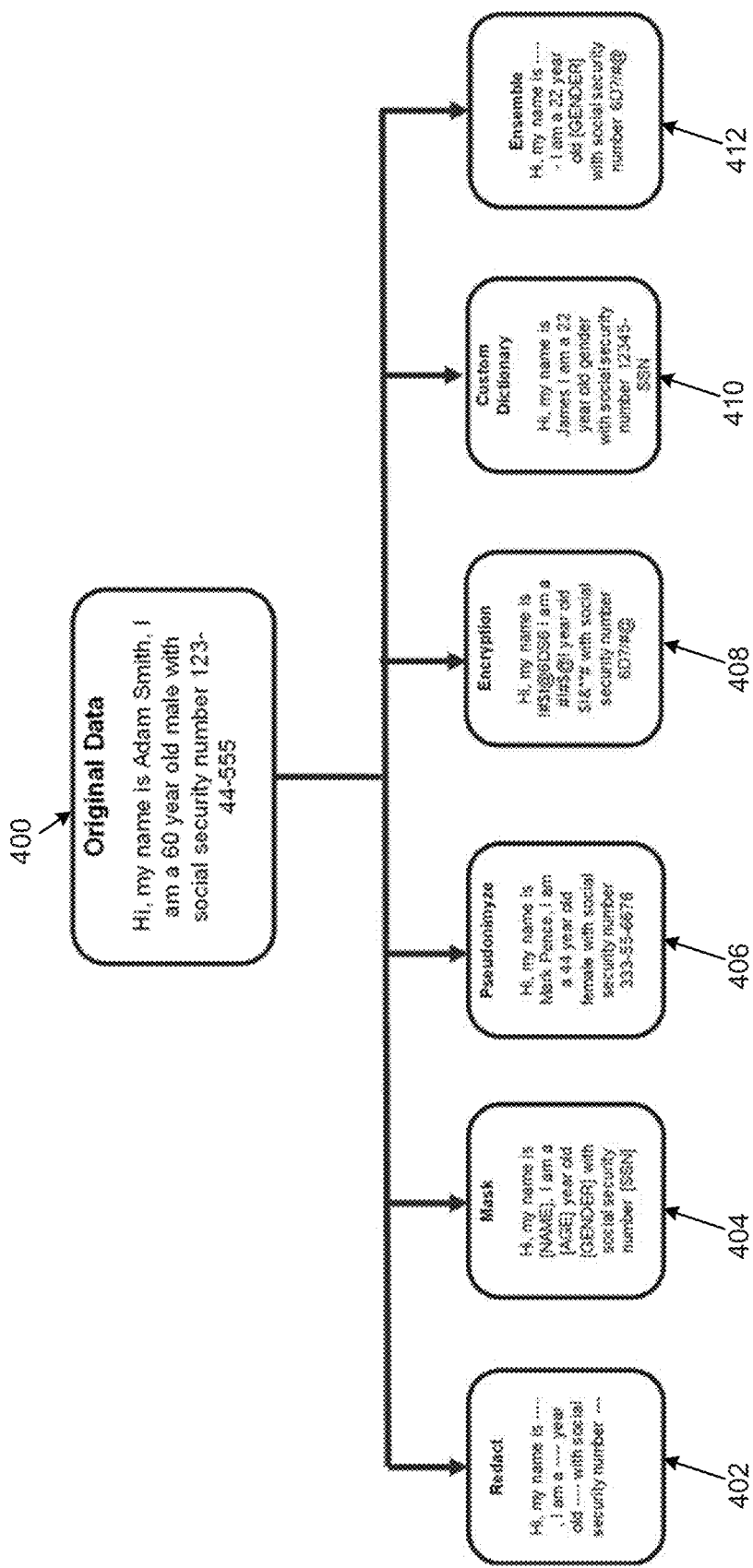
FIG. 4 illustrates replacement strategies to illustrate operation of the machine learning and rule-based identification, anonymization, and de-anonymization of sensitive structured and unstructured data apparatus of FIG. 1, in accordance with an example of the present disclosure.

FIG. 4 illustrates replacement strategies to illustrate operation of the apparatus 100, in accordance with an example of the present disclosure.

Referring to FIG. 4, with respect to original data at 400 (e.g., input data 104), examples of replaced data (e.g., masked data 120) based on replacement strategies for redaction, masking, pseudonymization, encryption, custom dictionary, and ensemble are respectively shown at 402-412. In this regard, the replacement strategy selector 112 may generate a recommendation that includes the most optimal replacement strategy among a list of replacement strategies. This recommendation may be determined based on the input received regarding the use case of the input data as well as the learned scored from historical records of the replacement strategies. Replacement strategies such as pseudonymization may utilize natural language tools to replace entities with semantically and structurally similar values to maintain the semantic integrity of the data, which may be specifically advantageous for building artificial intelligence models using this data.

Figure 5:
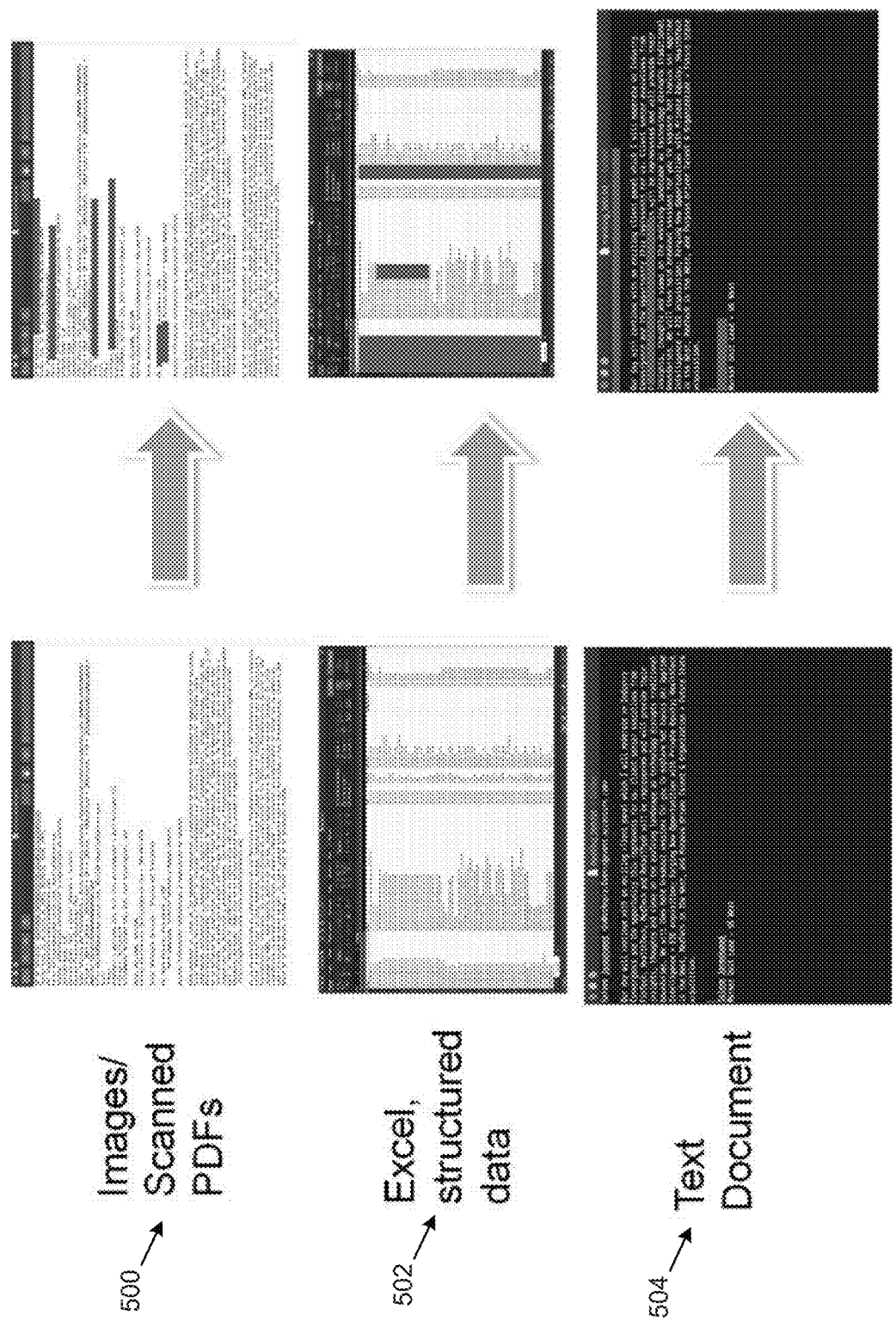
FIG. 5 illustrates database fields for anonymization of structured and unstructured data to illustrate operation of the machine learning and rule-based identification, anonymization, and de-anonymization of sensitive structured and unstructured data apparatus of FIG. 1, in accordance with an example of the present disclosure.

FIG. 5 illustrates database fields for anonymization of structured and unstructured data to illustrate operation of the apparatus 100, in accordance with an example of the present disclosure.

Referring to FIG. 5, with respect to database fields for anonymization of structured and unstructured data, examples of anonymization for input data 104 that includes images and scanned PDFs is shown at 500, Excel™ and structured data is shown at 502, and text document is shown at 504.

Figure 6:
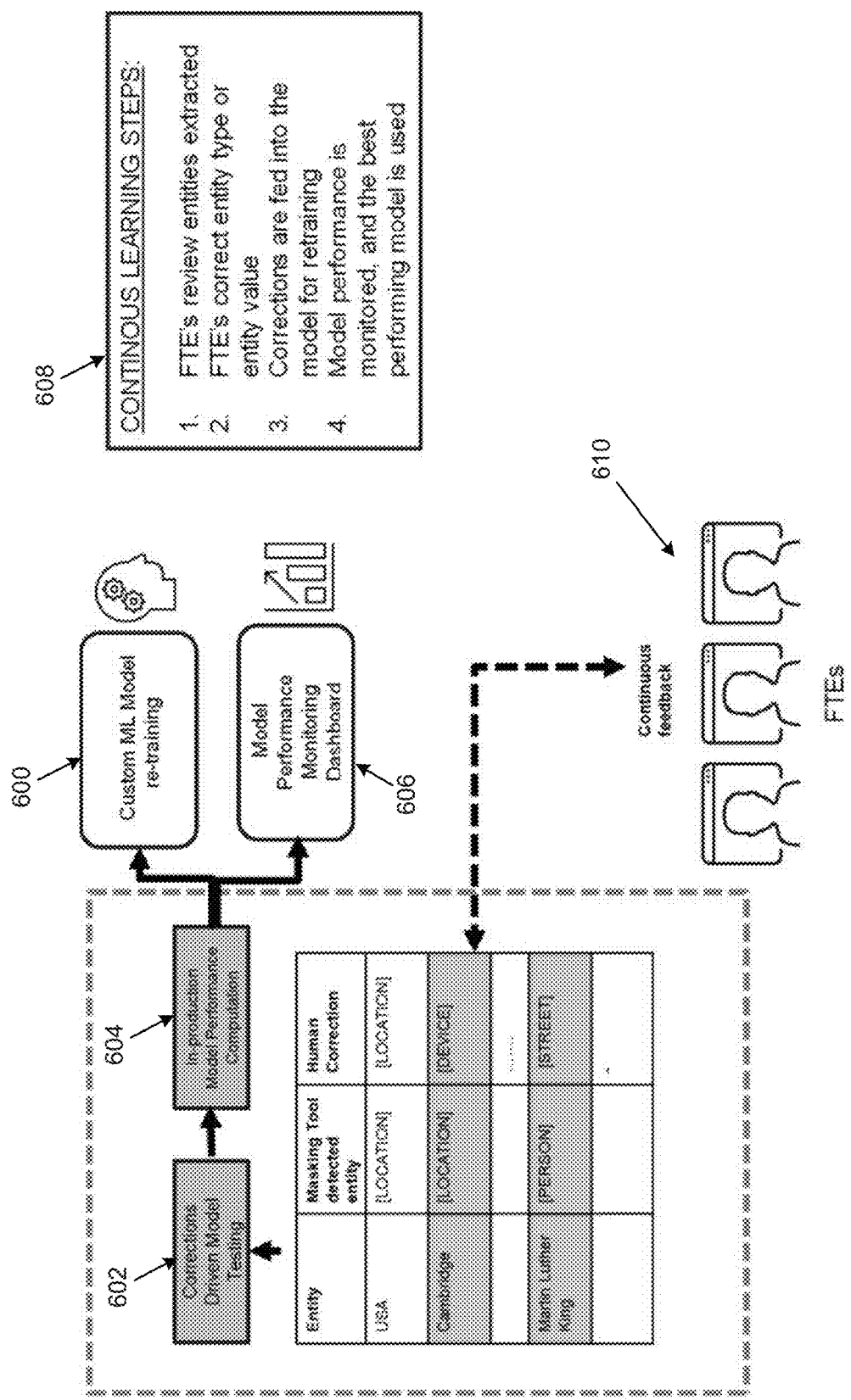
FIG. 6 illustrates a human-in-the-loop feedback mechanism for custom machine learning model training to illustrate operation of the machine learning and rule-based identification, anonymization, and de-anonymization of sensitive structured and unstructured data apparatus of FIG. 1, in accordance with an example of the present disclosure.

FIG. 6 illustrates a human-in-the-loop feedback mechanism for custom machine learning model training to illustrate operation of the apparatus 100, in accordance with an example of the present disclosure.

Referring to FIG. 6, with respect to human-in-the-loop feedback mechanism for custom machine learning model training, at 600, custom machine learning model training may be performed with respect to inputs from corrections driven model testing 602 and in-production model performance computation 604. In this regard, the in-production model performance computation 604 may be fed to a model performance monitoring dashboard at 606. Moreover, as shown at 608, continuous learning steps for personnel 610 are shown.

Figure 7:
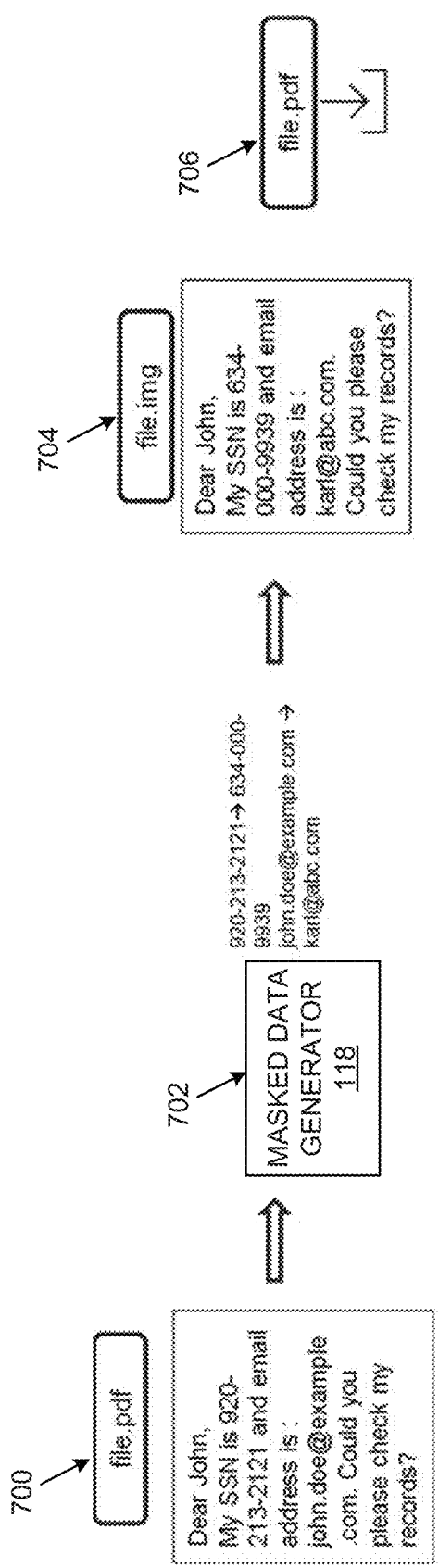
FIG. 7 illustrates anonymization of data on an original document to illustrate operation of the machine learning and rule-based identification, anonymization, and de-anonymization of sensitive structured and unstructured data apparatus of FIG. 1, in accordance with an example of the present disclosure.

FIG. 7 illustrates anonymization of data on an original document to illustrate operation of the apparatus 100, in accordance with an example of the present disclosure.

Referring to FIG. 7, with respect to anonymization of data on an original document (e.g., the input data 104), a PDF file 700 may be anonymized at 702 by the masked data generator 118. In this regard, the anonymization at 702 may include unstructured and structured data and database fields (e.g. including formats of input data such as image, pdf, email, excel spreadsheet, databases, etc.). The resulting ".img" anonymized file is shown at 704, and converted to a PDF file at 706.

Figure 8:
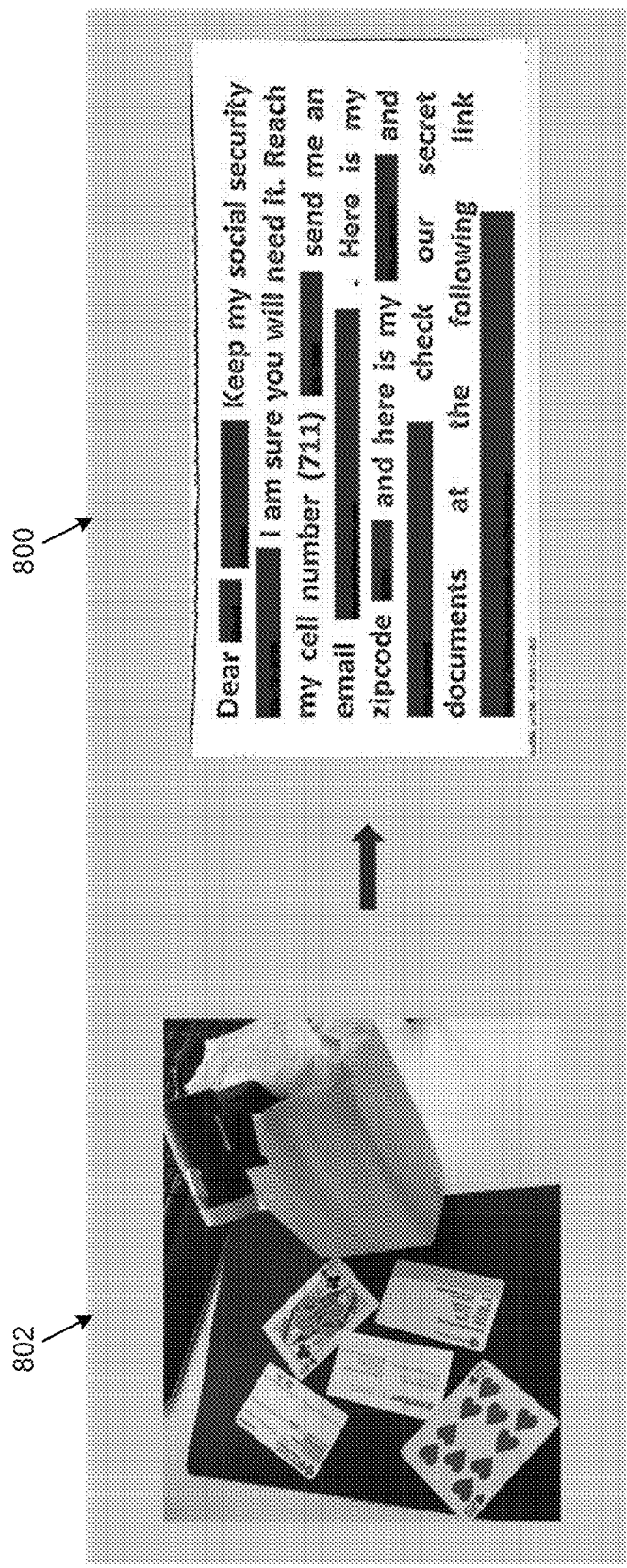
FIG. 8 illustrates replacement of sensitive information in real time to illustrate operation of the machine learning and rule-based identification, anonymization, and de-anonymization of sensitive structured and unstructured data apparatus of FIG. 1, in accordance with an example of the present disclosure.

FIG. 8 illustrates replacement of sensitive information in real time to illustrate operation of the apparatus 100, in accordance with an example of the present disclosure.

Referring to FIG. 8, with respect to replacement of sensitive information in real time, as shown at 800, sensitive information 802 may be replaced in real time by the masked data generator 118.

Figure 9:
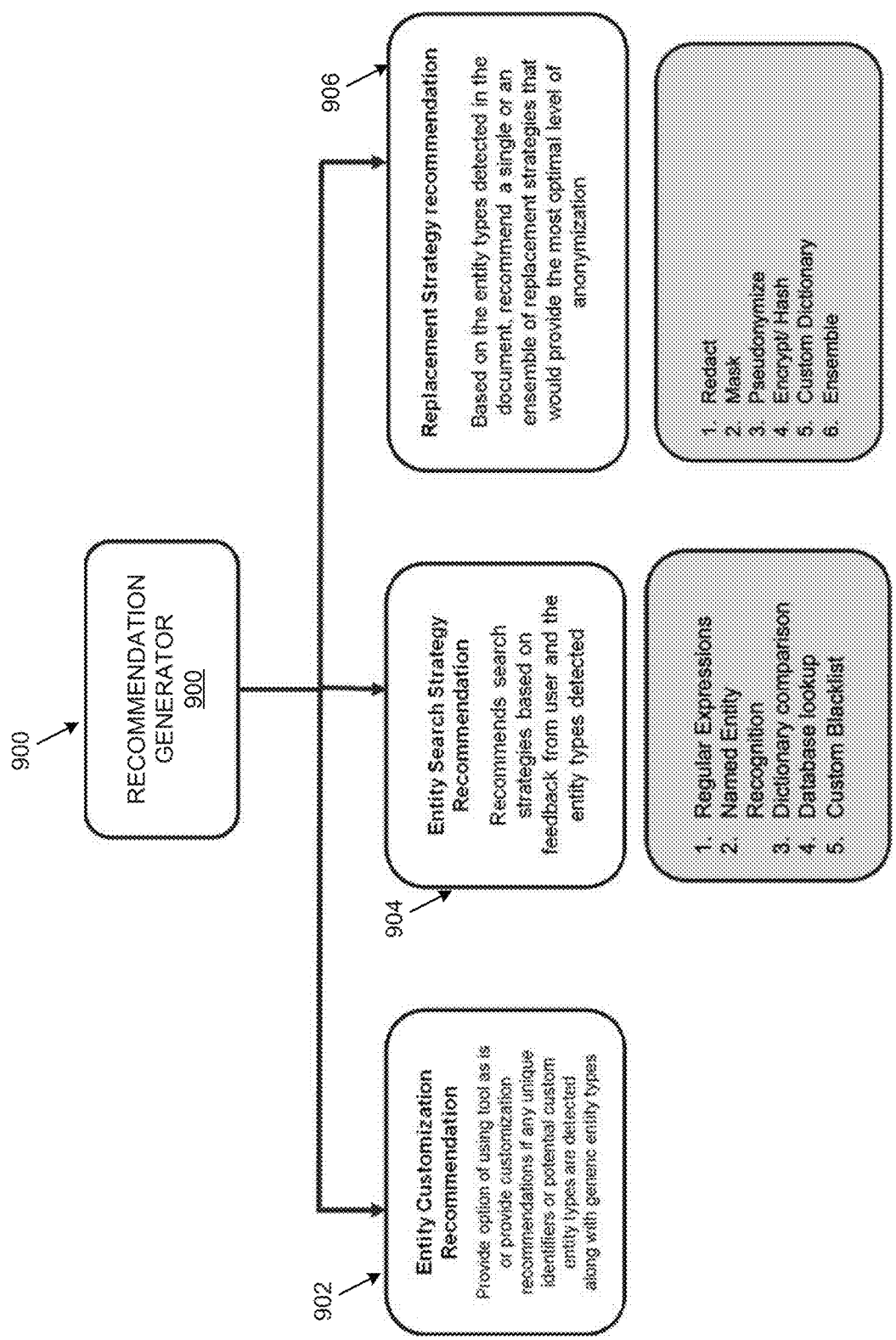
FIG. 9 illustrates a recommendation generator to illustrate operation of the machine learning and rule-based identification, anonymization, and de-anonymization of sensitive structured and unstructured data apparatus of FIG. 1, in accordance with an example of the present disclosure.

FIG. 9 illustrates a recommendation generator to illustrate operation of the apparatus 100, in accordance with an example of the present disclosure.

Referring to FIG. 9, the recommendation generator 900, which may include the entity extractor 102 and the replacement strategy selector 112, may generate various recommendations that include, for example, entity customization recommendation at 902, entity search strategy recommendation at 904, and replacement strategy recommendation at 906.

Entity customization recommendation at 902 may include, for example, providing an option of using the apparatus 100 as is or provide customization recommendations if any unique identifiers or potential custom entity types are detected along with generic entity types.

Entity search strategy recommendation at 904 may include recommendations of search strategies based on feedback from a user and the entity types detected. Examples may include regular expressions, named entity recognition, etc.

Replacement strategy recommendation 906 may be based on the entity types detected in a document to recommend a single or an ensemble of replacement strategies that would provide the most optimal level of anonymization. Examples may include redaction, masking, etc.

Figure 10:
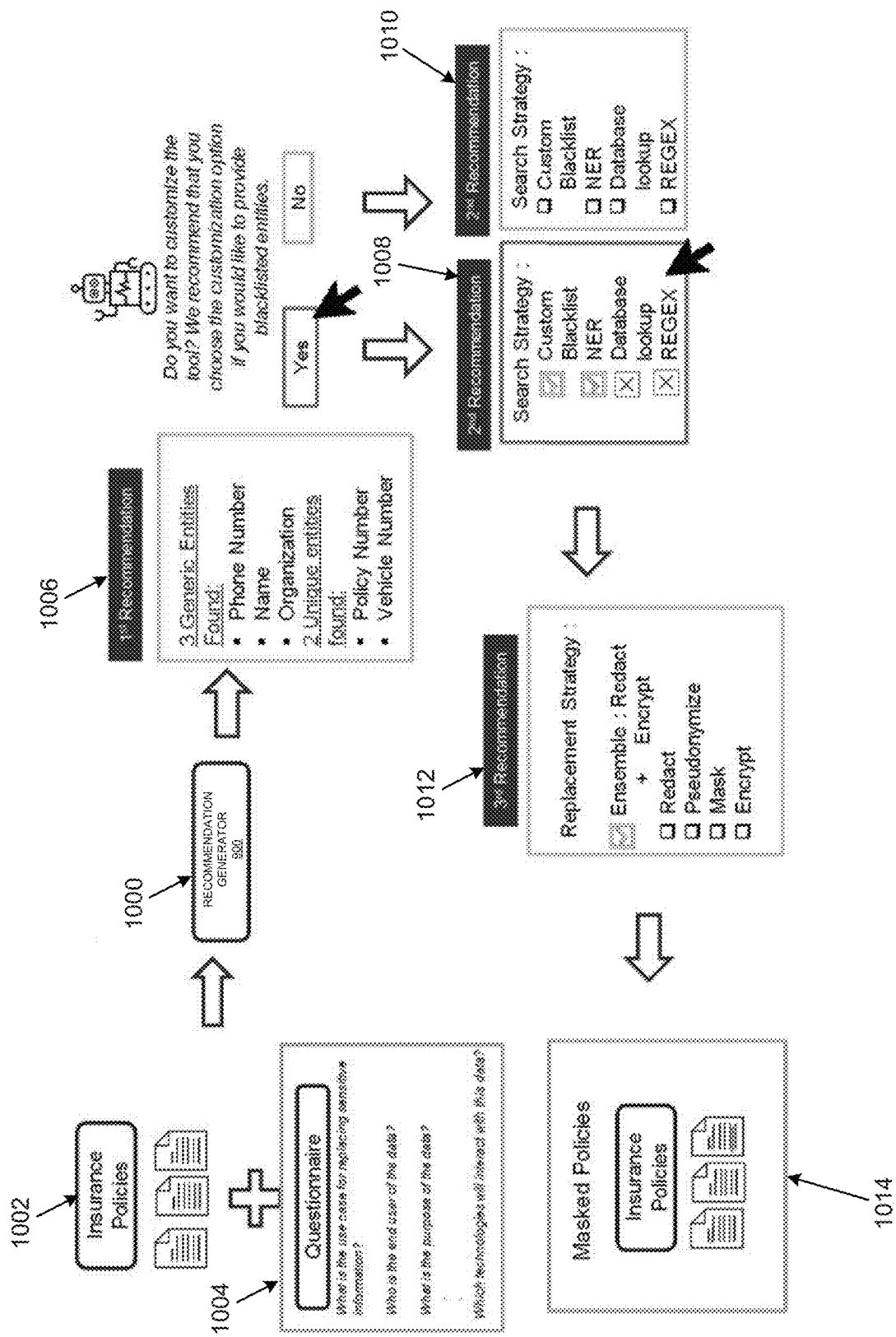
FIG. 10 illustrates a use case for the recommendation generator of Figure to illustrate operation of the machine learning and rule-based identification, anonymization, and de-anonymization of sensitive structured and unstructured data apparatus of FIG. 1, in accordance with an example of the present disclosure.

FIG. 10 illustrates a use case for the recommendation generator 900 of FIG. 9 to illustrate operation of the apparatus 100, in accordance with an example of the present disclosure.

Referring to FIG. 10, at 1000, the recommendation generator 900 may receive input data 104, such as insurance policies 1002 and responses to a questionnaire 1004. At 1006, 1008, 1010 and 1012, the recommendation generator 900 may generate recommendations. One of the recommendations may be implemented with respect to the masked policies at 1014, With respect to the recommendations 1006-1012, open source data may be used to identify different entity types and their common entity extraction methods. Similarly, common replacement strategies may be identified for specific entity types. The recommendation generator 900 may rank the search strategies and replacement techniques based on entities identified, questionnaire responses and knowledge from open-source data.

Figure 11:
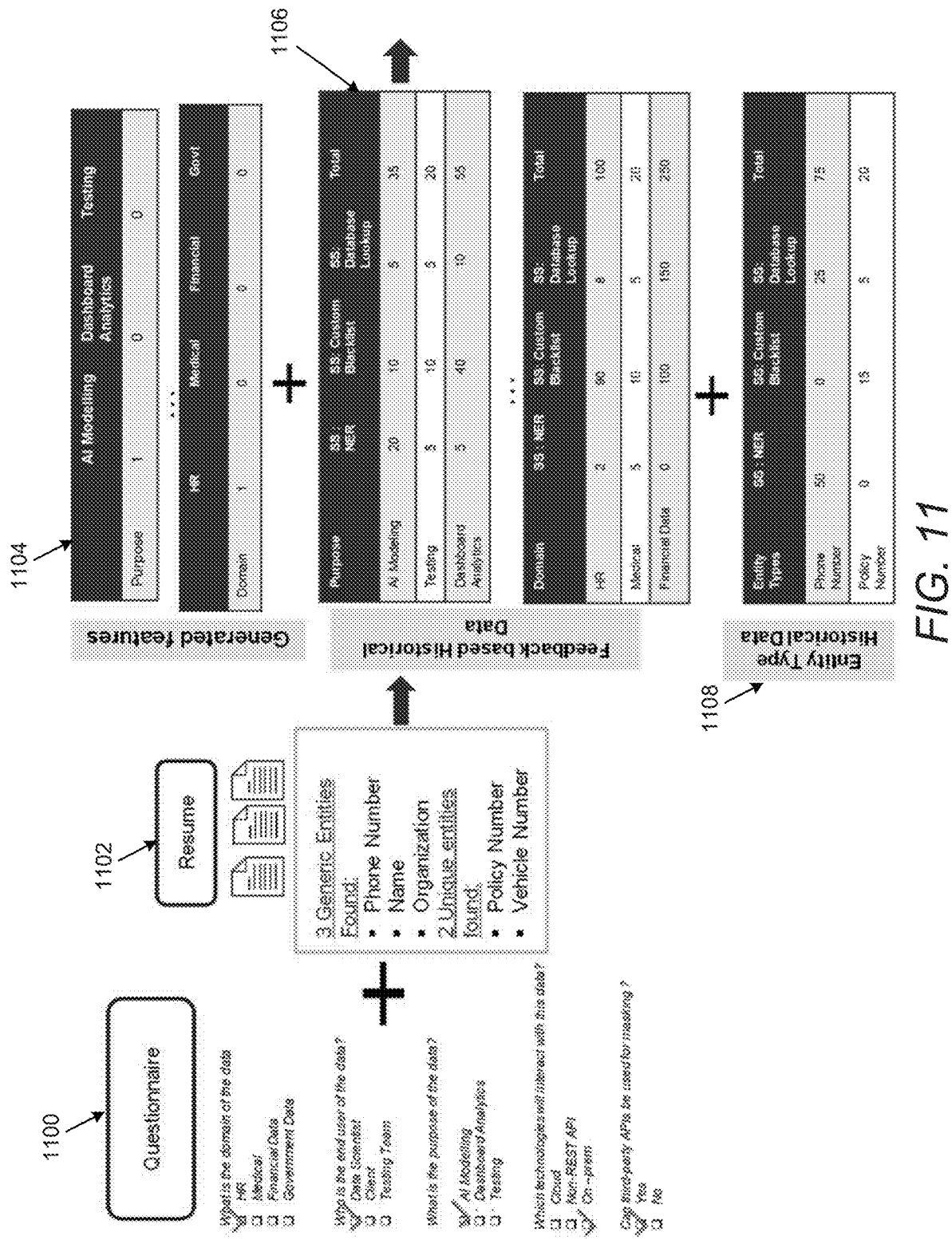
FIG. 11 illustrates a search strategy based use case for the recommendation generator of FIG. 9 to illustrate operation of the machine learning and rule-based identification, anonymization, and de-anonymization of sensitive structured and unstructured data apparatus of FIG. 1, in accordance with an example of the present disclosure.

FIG. 11 illustrates a search strategy based use case for the recommendation generator of FIG. 9 to illustrate operation of the apparatus 100, in accordance with an example of the present disclosure.

Referring to FIG. 11, with respect to search strategy based use case for the recommendation generator 900, the recommendation generator 900 may receive the input data 104 from a questionnaire 1100, and a resume 1102. The input data 104 from the questionnaire 1100, and the resume 1102 may be used to generate features at 1104, feedback based historical data 1106, and entity type historical data 1108.

Figure 12:
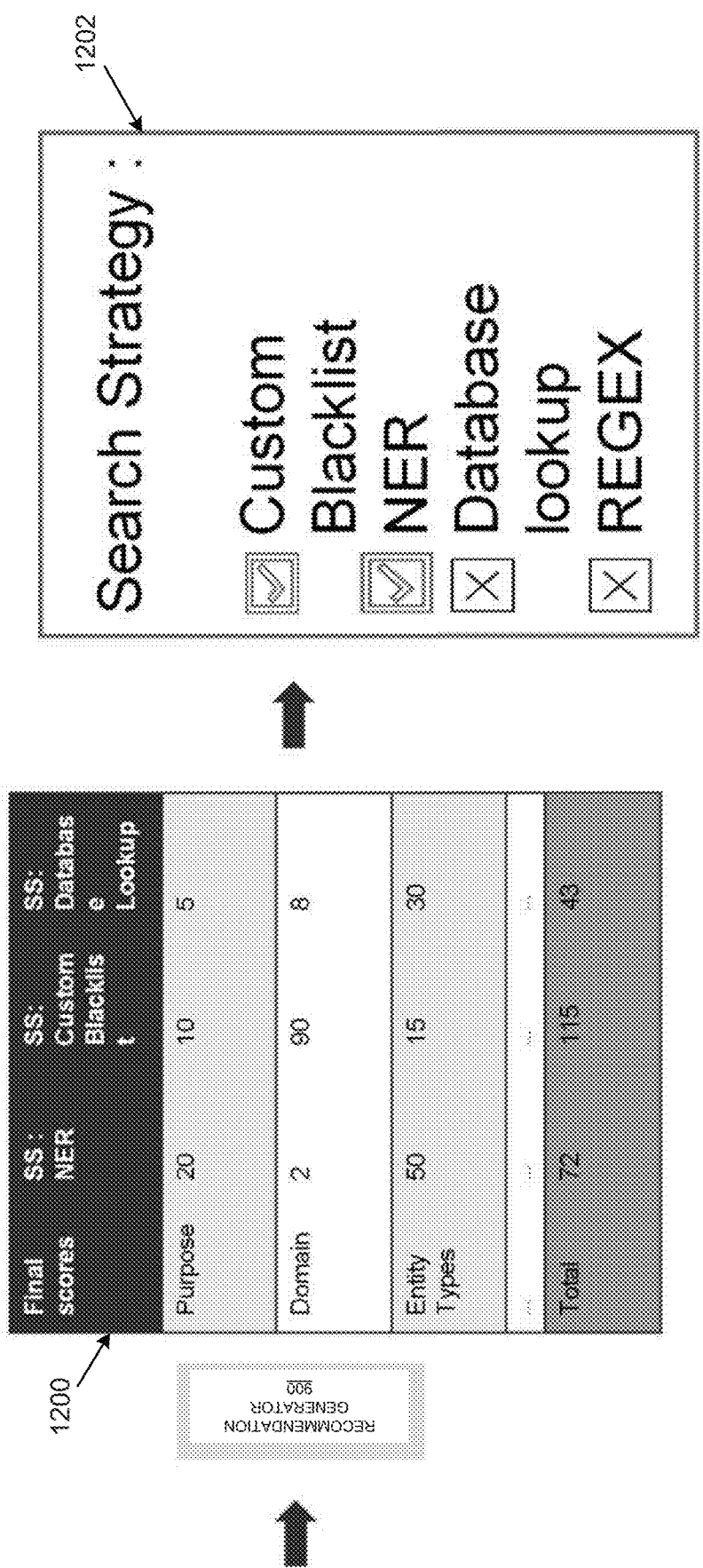
FIG. 12 illustrates further details of the search strategy based use case for the recommendation generator of FIG. 9 to illustrate operation of the machine learning and rule-based identification, anonymization, and de-anonymization of sensitive structured and unstructured data apparatus of FIG. 1, in accordance with an example of the present disclosure.

FIG. 12 illustrates further details of the search strategy based use case for the recommendation generator of FIG. 9 to illustrate operation of the apparatus 100, in accordance with an example of the present disclosure.

Referring to FIG. 12, with respect to search strategy based use case for the recommendation generator 900, the recommendation generator 900 may utilize an aggregation algorithm to determine final scores with respect to search strategies. For example, based on the final scores at 1200, the search strategies associated with customized blacklist and named entity recognition may be specified as 115 and 72 respectively, such that customized blacklist and named entity recognition are ranked the highest as shown at 1202.

Figure 13:
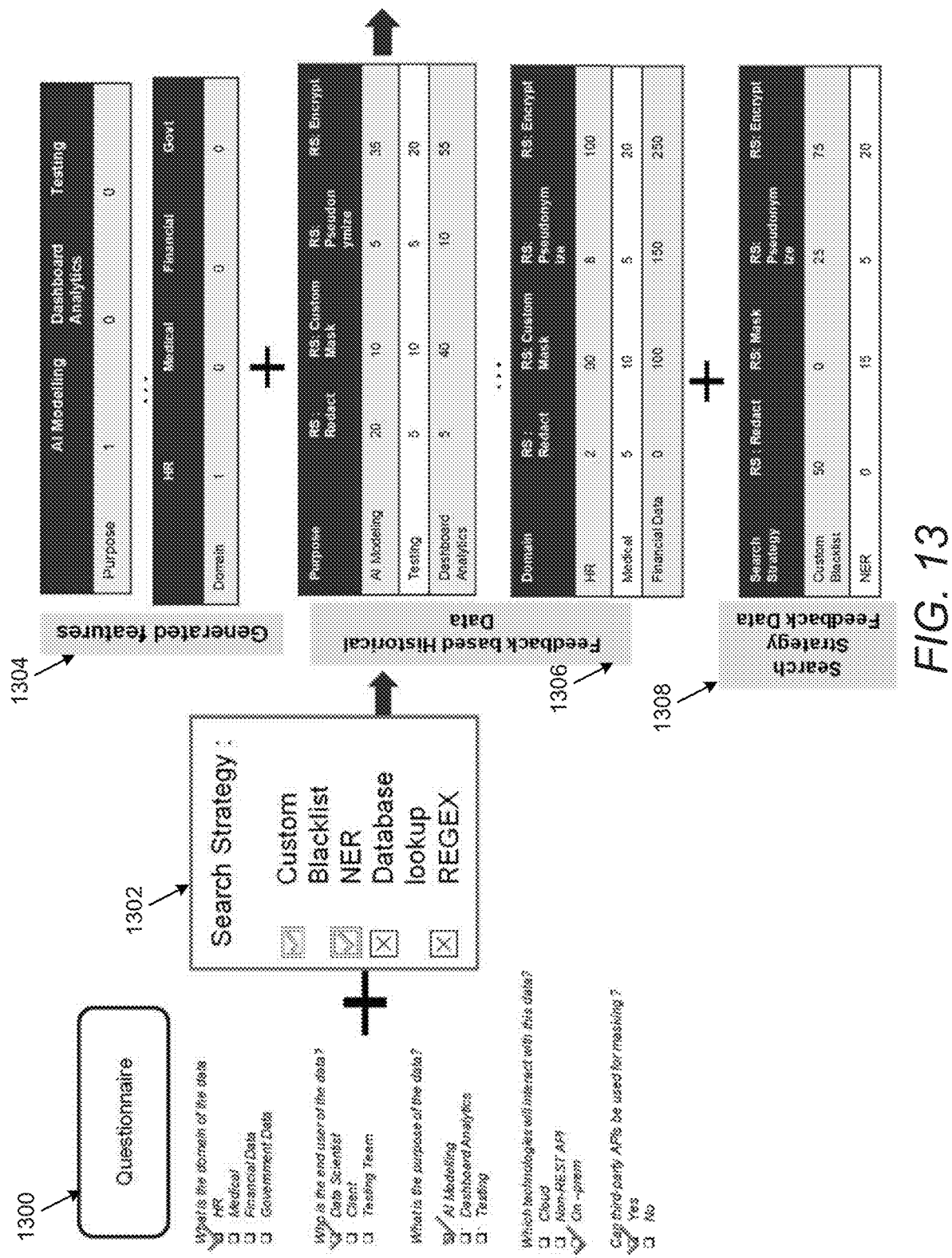
FIG. 13 illustrates a replacement strategy based use case for the recommendation generator of FIG. 9 to illustrate operation of the machine learning and rule-based identification, anonymization, and de-anonymization of sensitive structured and unstructured data apparatus of FIG. 1, in accordance with an example of the present disclosure.

FIG. 13 illustrates a replacement strategy based use case for the recommendation generator of FIG. 9 to illustrate operation of the apparatus 100, in accordance with an example of the present disclosure.

Referring to FIG. 13, with respect to the replacement strategy based use case for the recommendation generator 900, based on the input data 104 that includes the questionnaire at 1300 and the search strategy at 1302, the recommendation generator 900 may generate features at 1304, feedback based historical data at 1306, and search strategy feedback data at 1308, With respect to the generation of features at 1304, with respect to derivatives such as risk, if the purpose of artificial intelligence is to make decisions of high impact, A high risk score may be assigned to the replacement strategies accordingly. The risk score may be used to determine the final weighted scores based on use case. The historical data may be coupled with learned risk scores for a given use case and application, and then weighted to produce the final recommendations.

Figure 14:
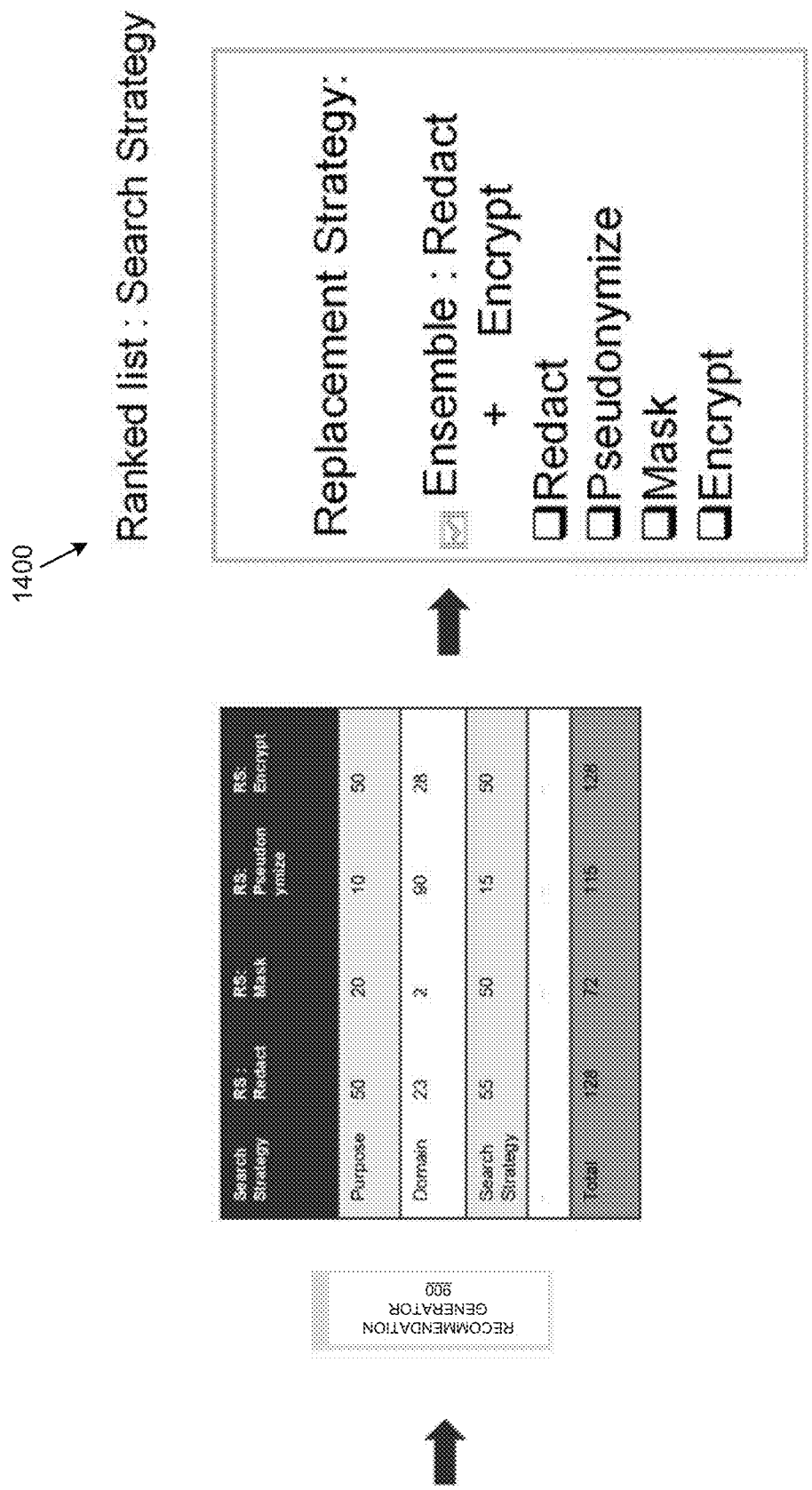
FIG. 14 illustrates further details of the replacement strategy based use case for the recommendation generator of FIG. 9 to illustrate operation of the machine learning and rule-based identification, anonymization, and de-anonymization of sensitive structured and unstructured data apparatus of FIG. 1, in accordance with an example of the present disclosure.

FIG. 14 illustrates further details of the replacement strategy based use case for the recommendation generator of FIG. 9 to illustrate operation of the apparatus 100, in accordance with an example of the present disclosure.

Referring to FIG. 14, with respect to the replacement strategy based use case for the recommendation generator 900, the recommendation generator 900 may generate a ranked list of search strategies. As shown at 1400, for the ranked list example of FIG. 14, the search strategies redact and encrypt may be specified as the highest replacement strategy.

FIG. 15 illustrates recommendation of replacement strategies to illustrate operation of the apparatus 100, in accordance with an example of the present disclosure.

Referring to FIG. 15, with respect to recommendation of replacement strategies, information from input data 104 that includes the data source 1500 and questionnaire 1502 may be received by the recommendation generator 900 at 1504 to generate replacement strategies 1506 that include redaction, masking, pseudonymization, encryption, and custom dictionary.

Figure 16:
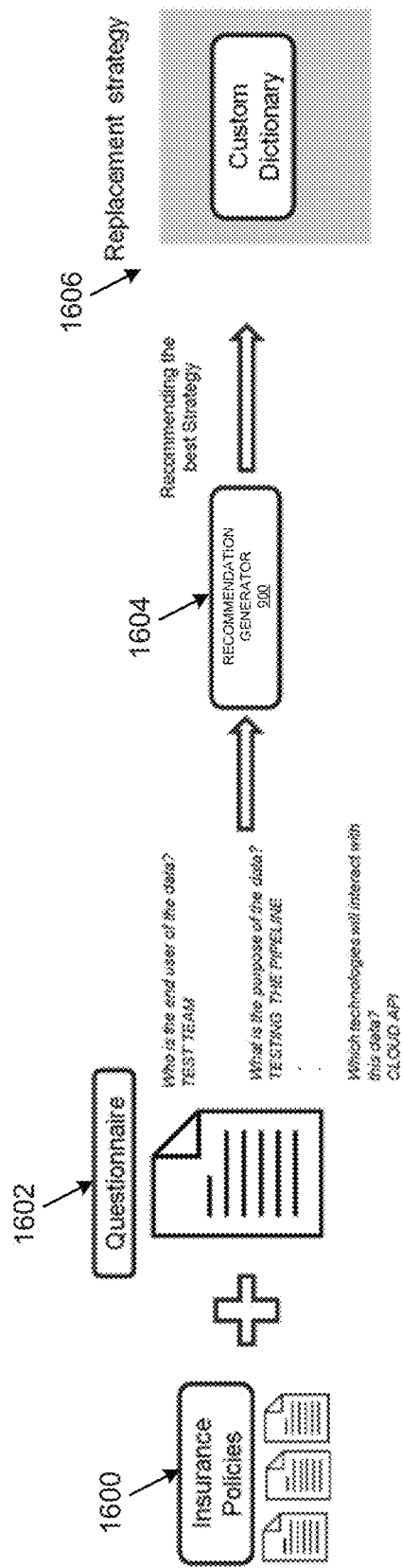
FIG. 16 illustrates further details of recommendation of replacement strategies to illustrate operation of the machine learning and rule-based identification, anonymization, and de-anonymization of sensitive structured and unstructured data apparatus of FIG. 1, in accordance with an example of the present disclosure.

FIG. 16 illustrates further details of recommendation of replacement strategies to illustrate operation of the apparatus 100, in accordance with an example of the present disclosure.

Figure 17:
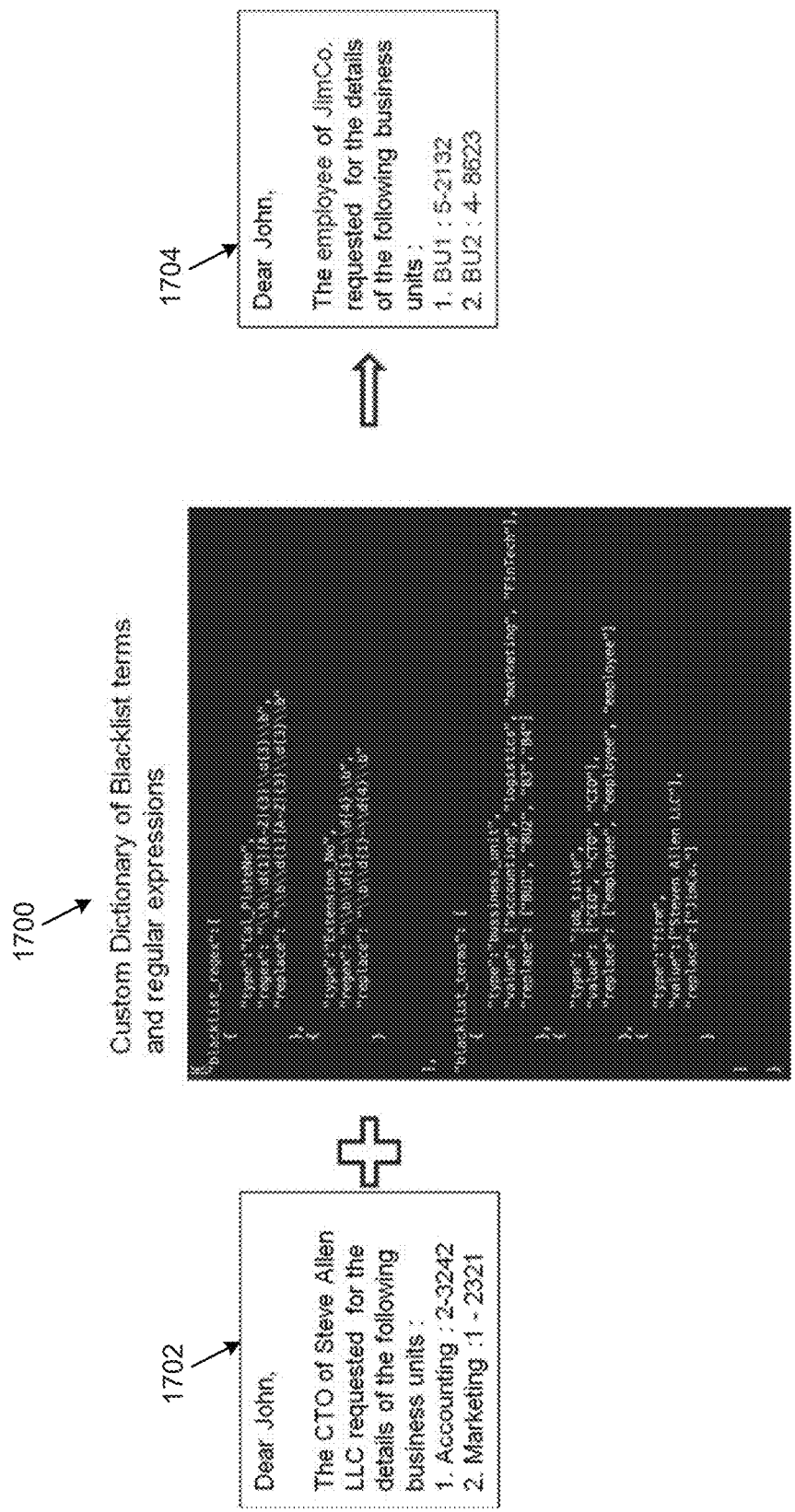
FIG. 17 illustrates domain specific directory and customization for client's training data to illustrate operation of the machine learning and rule-based identification, anonymization, and de-anonymization of sensitive structured and unstructured data apparatus of FIG. 1, in accordance with an example of the present disclosure.

Referring to FIG. 16, with respect to recommendation of replacement strategies, information from the input data 104 that includes the insurance policies 1600 and questionnaire 1602 may be received by the recommendation generator 900 at 1604 to generate the best replacement strategy that includes custom dictionary, FIG. 17 illustrates domain specific directory and customization for client's training data to illustrate operation of the apparatus 100, in accordance with an example of the present disclosure.

Referring to FIG. 17, with respect to domain specific directory and customization for client's training data, based on the custom dictionary of blacklist terms and regular expressions as shown at 1700, the input data 104 at 1702 may be converted to output data 1704 as shown. In this regard, the masked data generator 118 may generate, based on the application of the at least one determined replacement strategy 114 to the at least one extracted entity 110, the masked data 120 at 1704.

Figure 18:
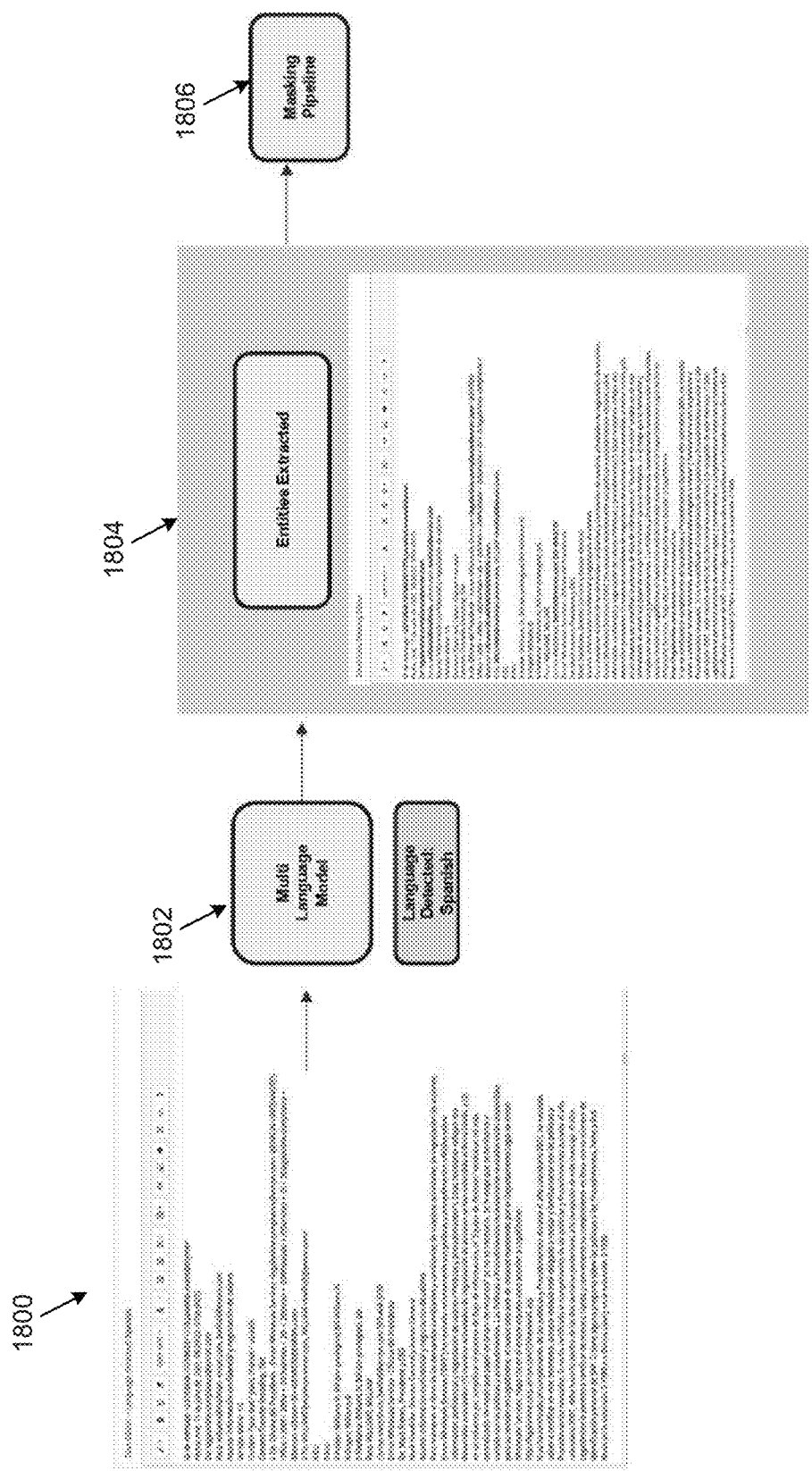
FIG. 18 illustrates support of multiple languages to illustrate operation of the machine learning and rule-based identification, anonymization, and de-anonymization of sensitive structured and unstructured data apparatus of FIG. 1, in accordance with an example of the present disclosure.

FIG. 18 illustrates support of multiple languages to illustrate operation of the apparatus 100, in accordance with an example of the present disclosure.

Referring to FIG. 18, with respect to support of multiple languages, data at 1800 may be received by a multi-language model 1802 (e.g., the language translator 122) to detect a language type (e.g., Spanish). Based on the detected language, entities may be extracted by the entity extractor 102 at 1804 and forwarded to a masking pipeline 1806.

Figure 19:
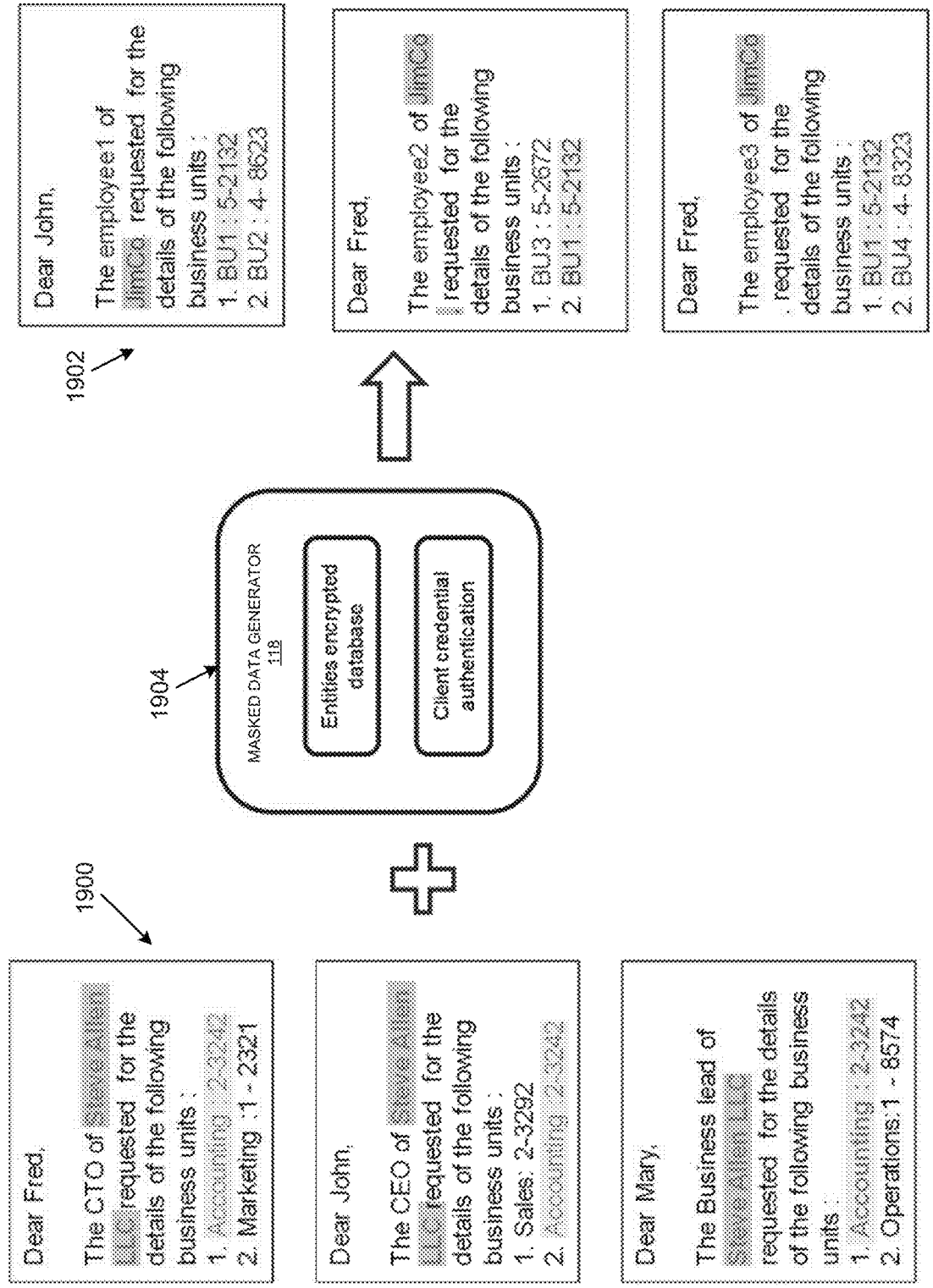
FIG. 19 illustrates maintenance of consistency of masked entities within a masking dataset to illustrate operation of the machine learning and rule-based identification, anonymization, and de-anonymization of sensitive structured and unstructured data apparatus of FIG. 1, in accordance with an example of the present disclosure.

FIG. 19 illustrates maintenance of consistency of masked entities within a masking dataset to illustrate operation of the apparatus 100, in accordance with an example of the present disclosure.

Referring to FIG. 19, with respect to maintenance of consistency of masked entities within a masking dataset, within the same database, masked values of same entities are persisted, (e.g., Steve Allen LLC at 1900 will be replaced at 1902 by the masked data generator 118 at 1904 with the same masked value within the document and across all documents in the same database).

Figure 20:
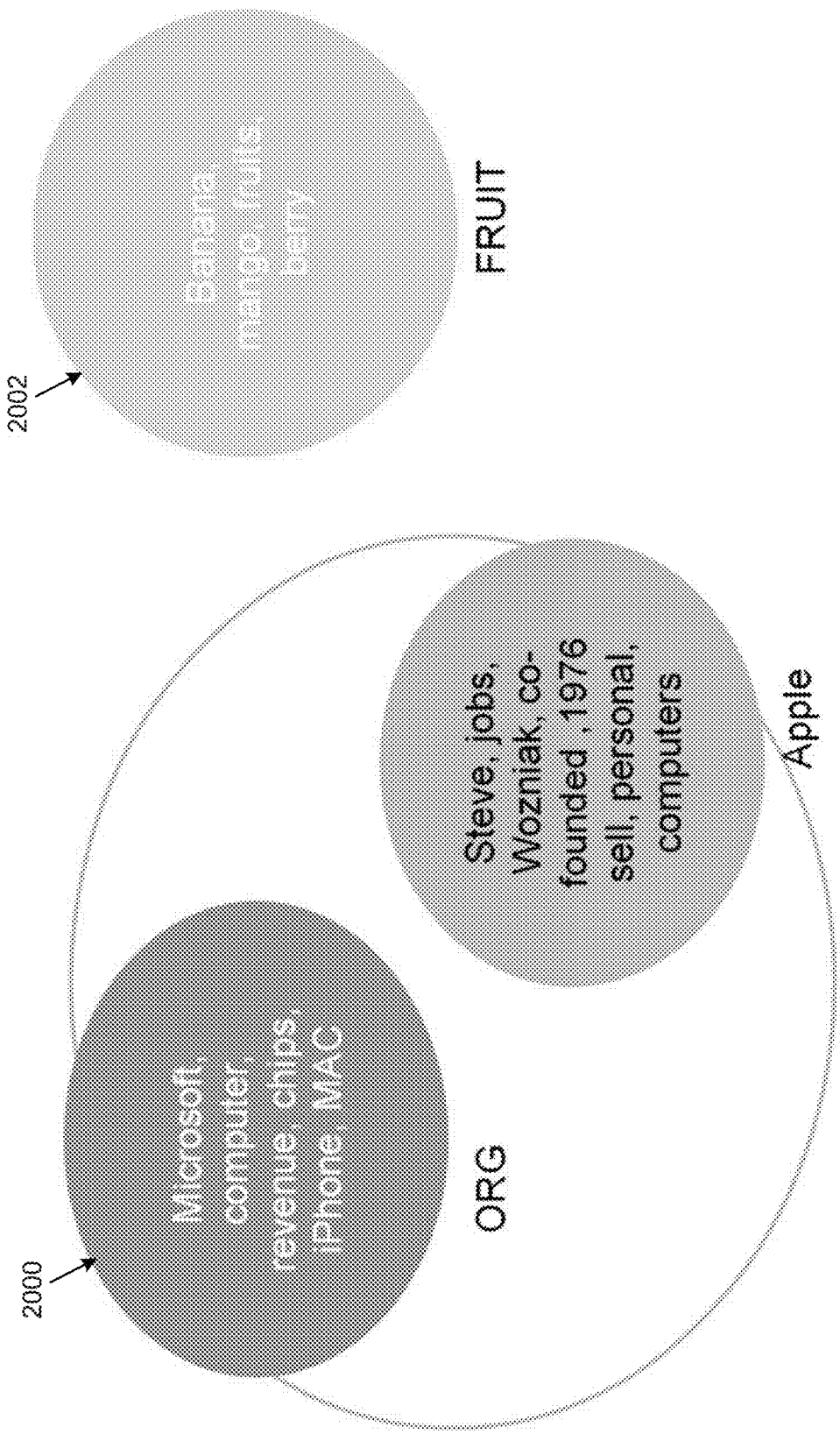
FIG. 20 illustrates leveraging context for entity conflict resolution to illustrate operation of the machine learning and rule-based identification, anonymization, and de-anonymization of sensitive structured and unstructured data apparatus of FIG. 1, in accordance with an example of the present disclosure.

FIG. 20 illustrates leveraging context for entity conflict resolution to illustrate operation of the apparatus 100, hi accordance with an example of the present disclosure.

Referring to FIG. 20, with respect to leveraging context for entity conflict resolution, when a word is identified as two different entities, the entity conflict resolver 124 may determine which entity the word should be assigned to. In this regard, since Steven Paul Jobs and Stephen Gary Wozniak co-founded Apple in 1976 to sell personal computers, apple may be ORG in NEIL at 2000, and a FRUIT in database lookup at 2002. In this regard, the entity conflict resolver 124 may implement K nearest neighbors and a priority list of search strategies as disclosed herein with reference to FIG. 21.

Figure 21:
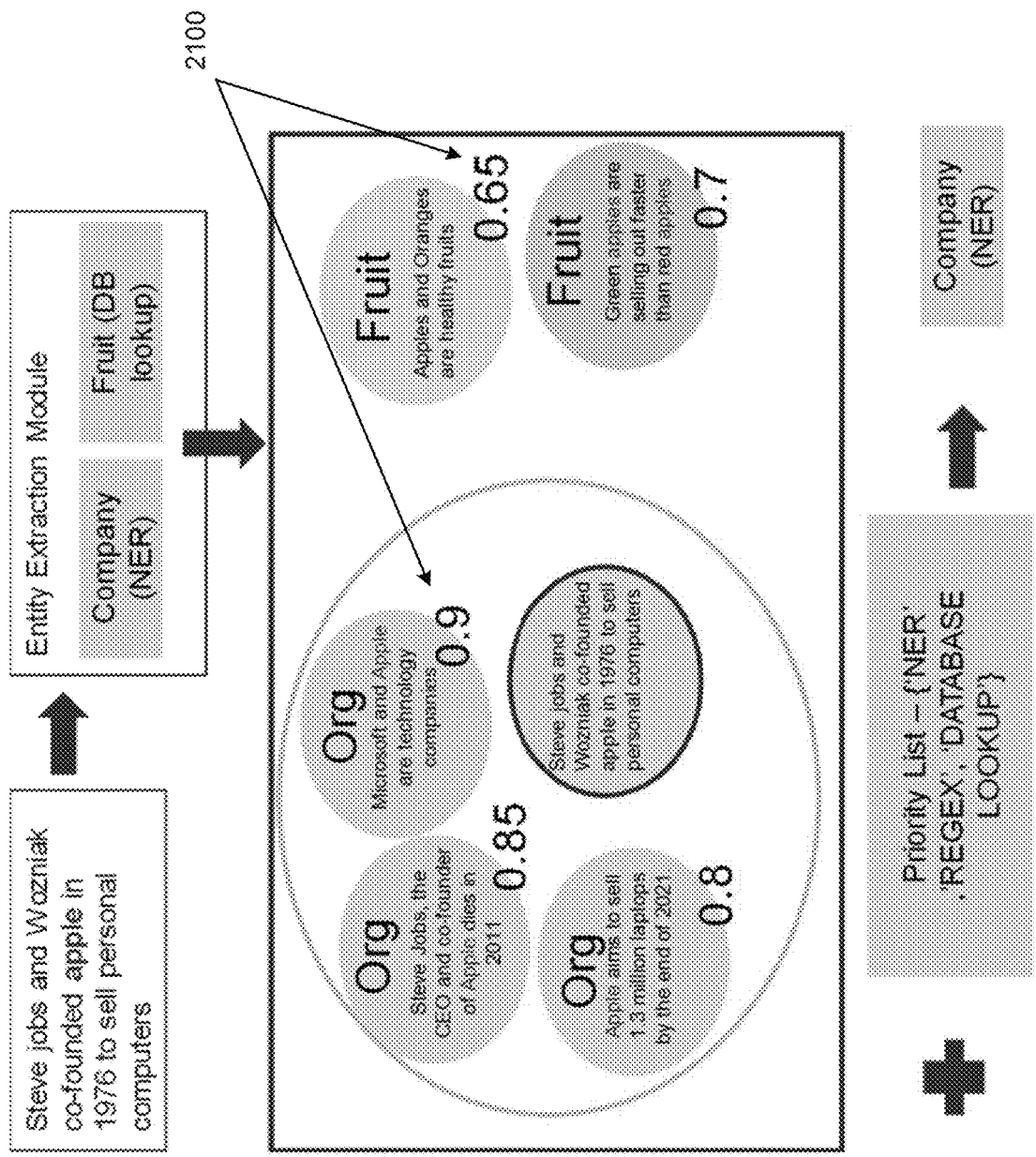
FIG. 21 illustrates further details of leveraging context for entity conflict resolution to illustrate operation of the machine learning and rule-based identification, anonymization, and de-anonymization of sensitive structured and unstructured data apparatus of FIG. 1, in accordance with an example of the present disclosure.

FIG. 21 illustrates further details of leveraging context for entity conflict resolution to illustrate operation of the apparatus 100, in accordance with an example of the present disclosure.

Referring to FIG. 21, with respect to leveraging context for entity conflict resolution, a token may be detected as two different entity types in a document. In this regard, sentences around the tokens may be extracted, and embeddings of these sentences may be created to visualize the sentences in semantic vector space. The closest embeddings may be selected using semantic similarity. In this regard, either a classification or clustering approach may be implemented to determine the most similar topic or keywords for the entity and the surrounding context. At 2100, the confidence may be determined for the K nearest neighbors using the semantic similarity scores and the priority weights of the respective search strategies. Based on the highest score (e.g., 0.9 for the example of FIG. 21), the final entity type may be selected.

Figure 22:
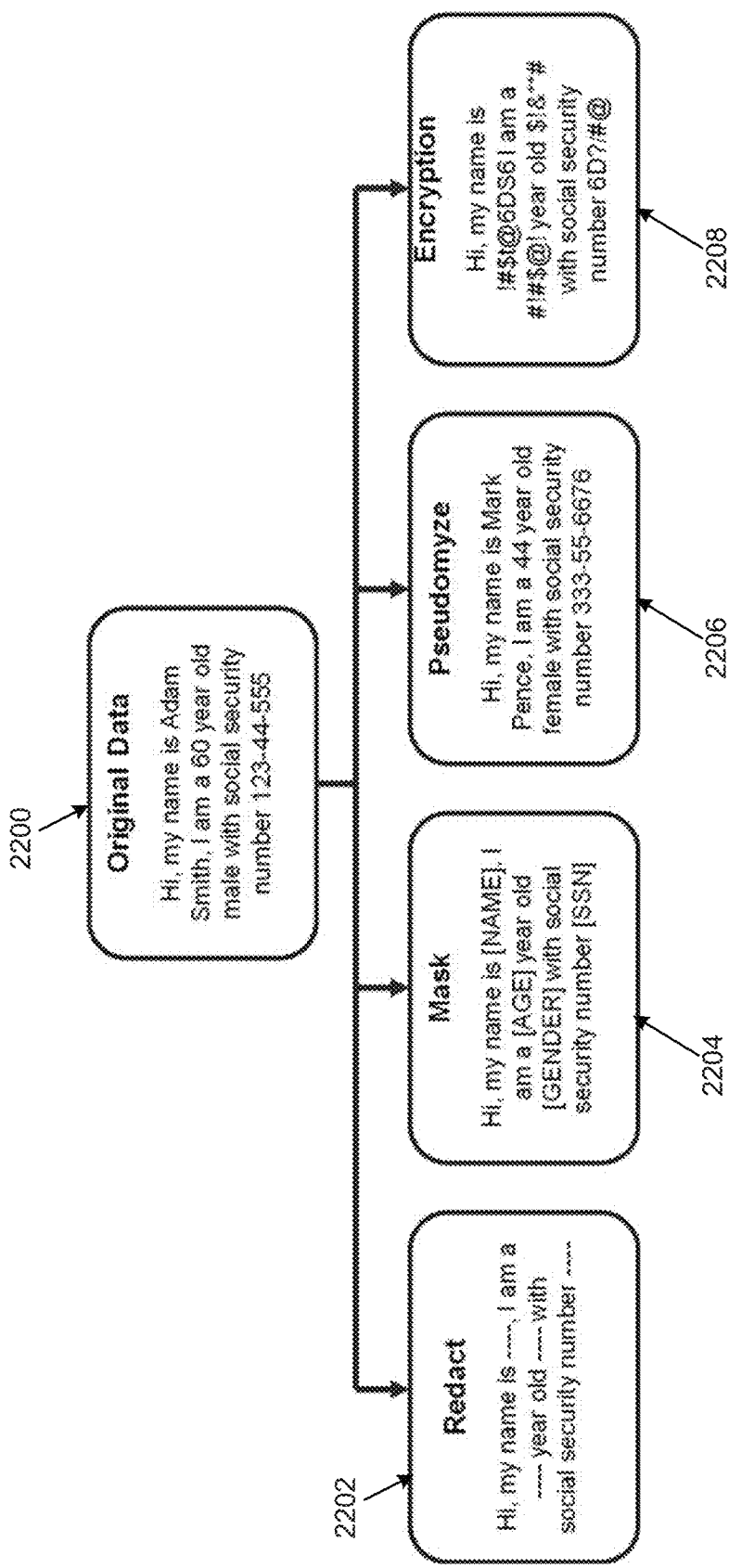
FIG. 22 illustrates data masking to illustrate operation of the machine learning and rule-based identification, anonymization, and de-anonymization of sensitive structured and unstructured data apparatus of FIG. 1, in accordance with an example of the present disclosure.

FIG. 22 illustrates data masking to illustrate operation of the apparatus 100, in accordance with an example of the present disclosure.

Referring to FIG. 22, with respect to data masking, for original data 2200, examples of data masking for redaction, masking, pseudonymization, and encryption are respectively shown at 2002-2008.

Figure 23:
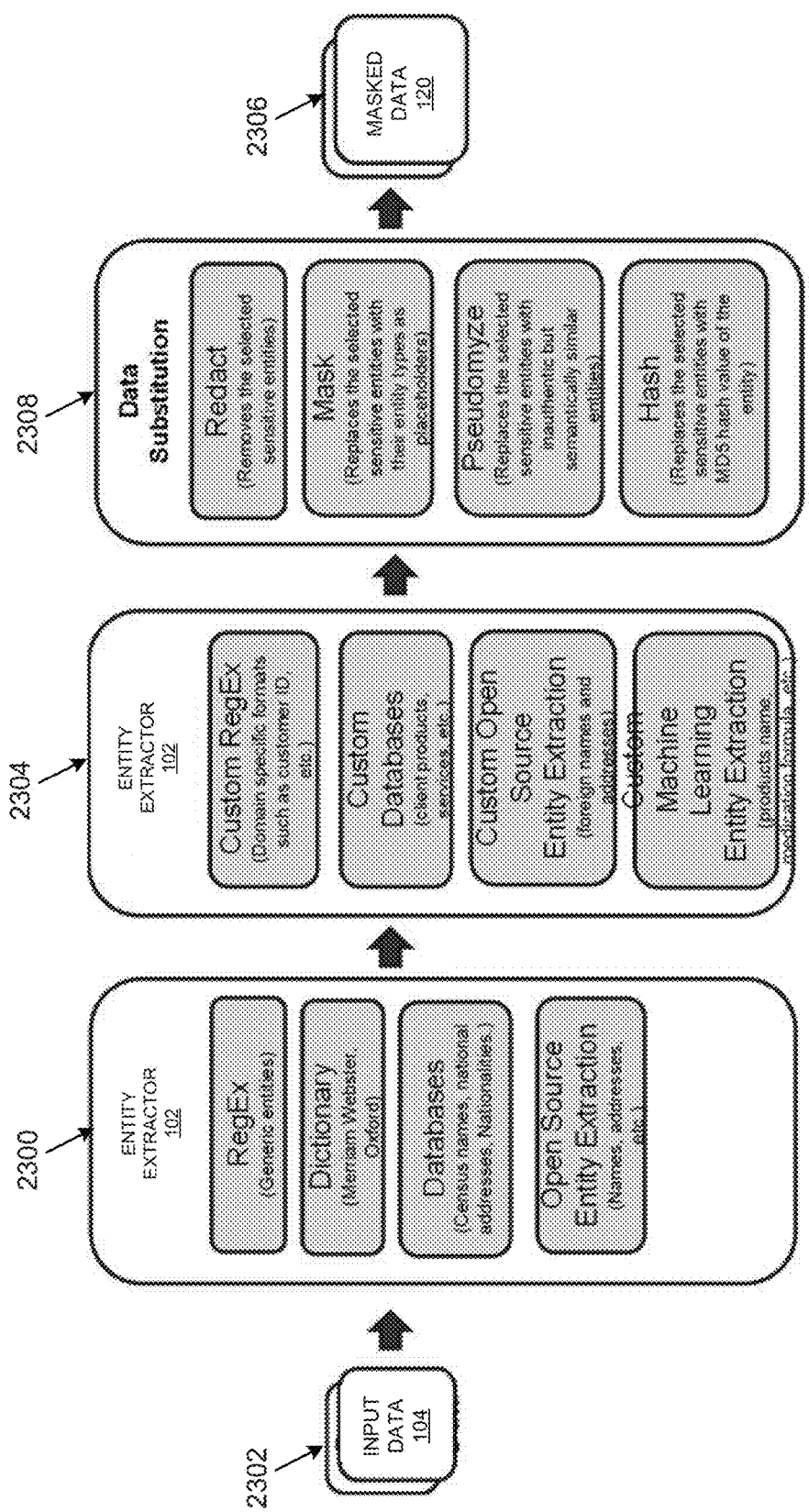
FIG. 23 illustrates a data masking architecture to illustrate operation of the machine learning and rule-based identification, anonymization, and de-anonymization of sensitive structured and unstructured data apparatus of FIG. 1, in accordance with an example of the present disclosure.

FIG. 23 illustrates a data masking architecture to illustrate operation of the apparatus 100, in accordance with an example of the present disclosure.

Referring to FIG. 23, with respect to the data masking architecture, the apparatus 100 may include the entity extractor 102 to extract, at 2300, information from input data 104 at 2302. For example, the information may be extracted using regular expressions (e.g., generic entities), dictionary based entity search outside of language vocabulary (e.g., Merriam Webster, Oxford, etc.), databases (e.g., census names, national addresses, nationalities, etc.), and open source entity extraction (names, addresses, etc.). In a similar manner, the entity extractor 102 may extract, at 2304, custom information based on custom regular expressions (e.g., domain specific formats such as customer ID, etc.), custom databases (e.g., client products, services, etc.), custom open source entity extraction (foreign names and addresses, etc., and custom machine learning entity extraction (e.g., product name, medication formula, etc.). The masked data generator 118 may generate the masked data 120 at 2306 by performing, using the replacement strategies selected by the replacement strategy selector 112 at 2308, operations such as redaction, masking, pseudonymization, and hashing.

Figure 24:
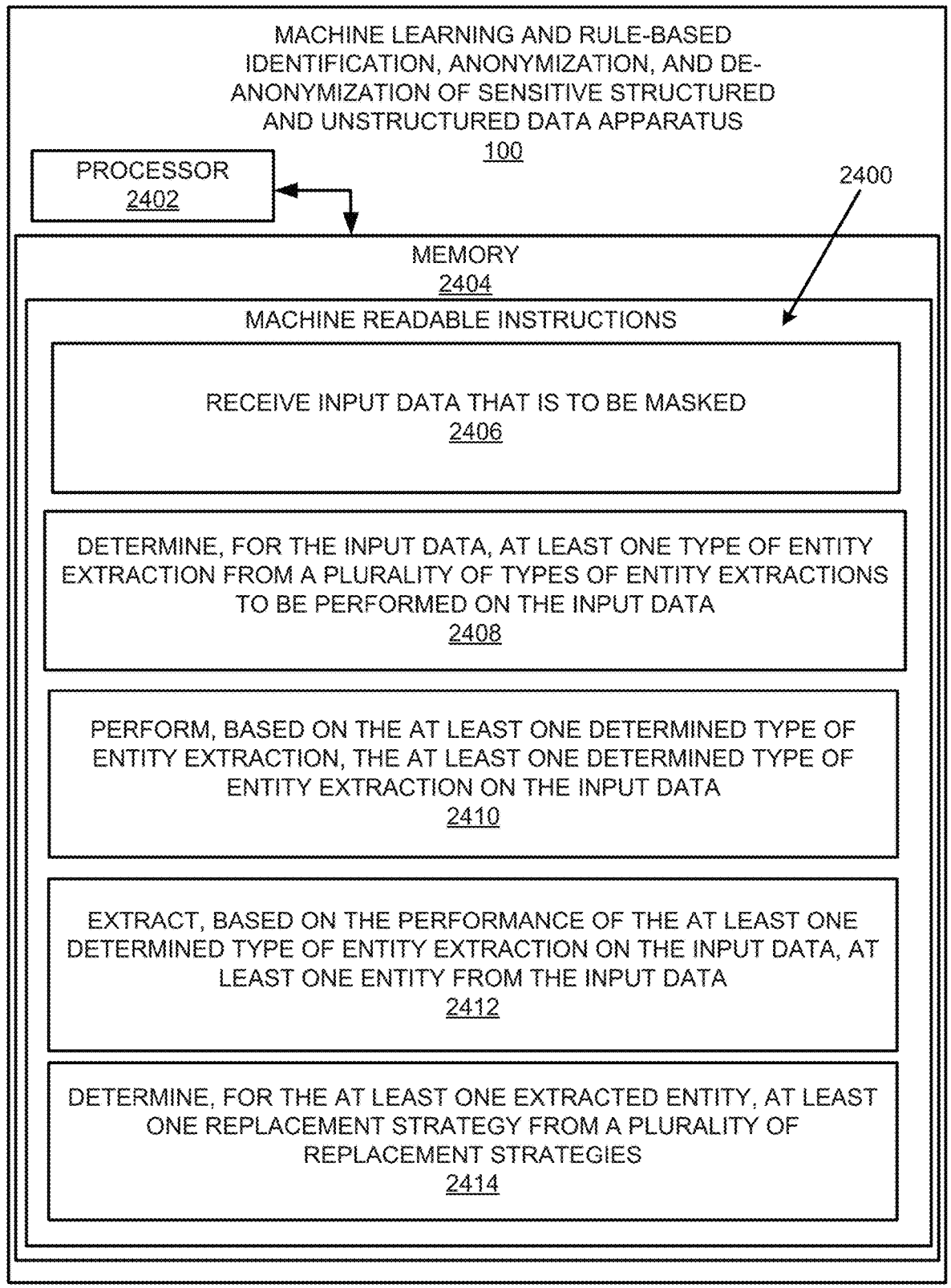
FIG. 24 illustrates an example block diagram for machine learning and rule-based identification, anonymization, and de-anonymization of sensitive structured and unstructured data in accordance with an example of the present disclosure.
Figure 24:
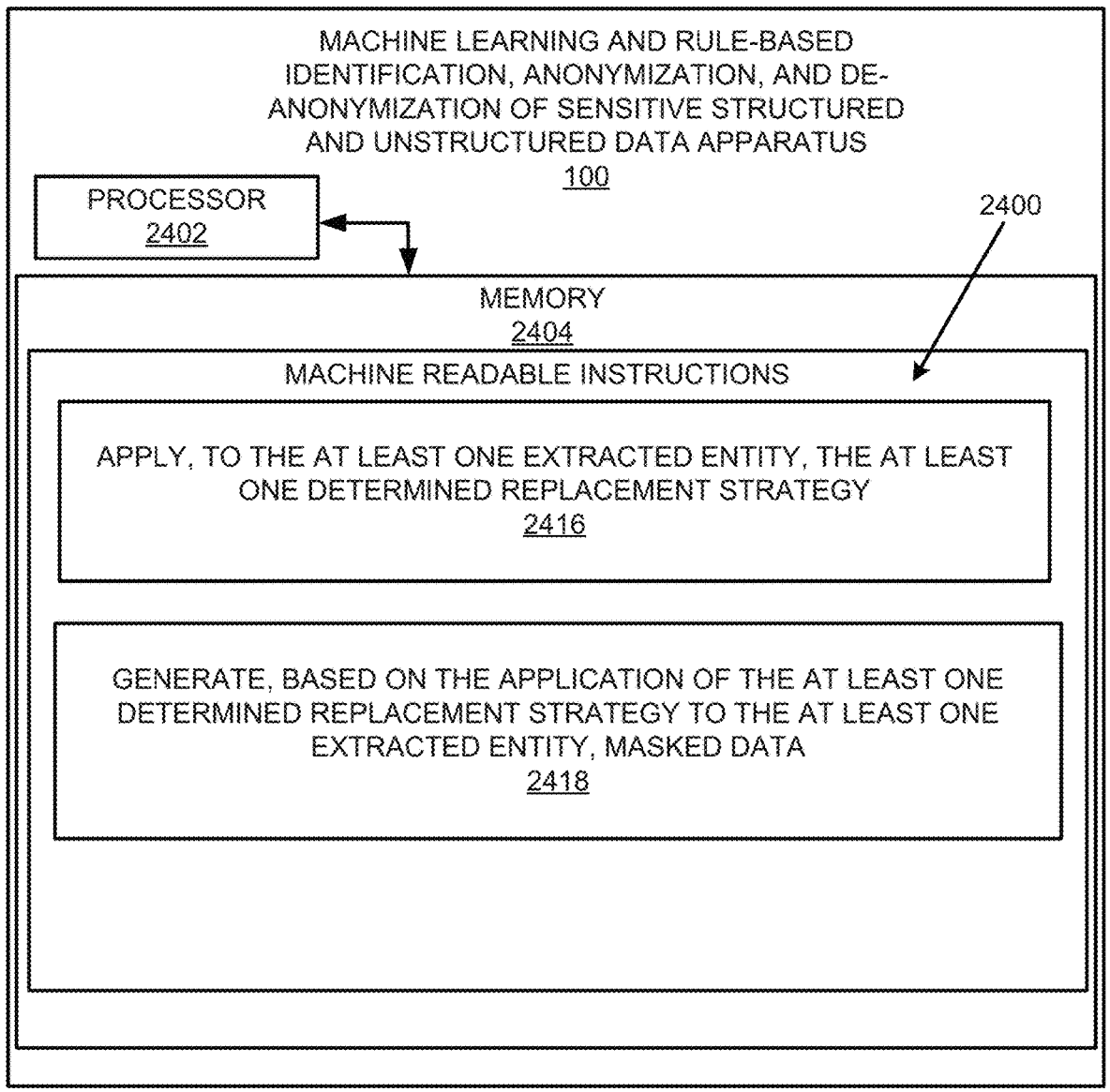
Figure 26:
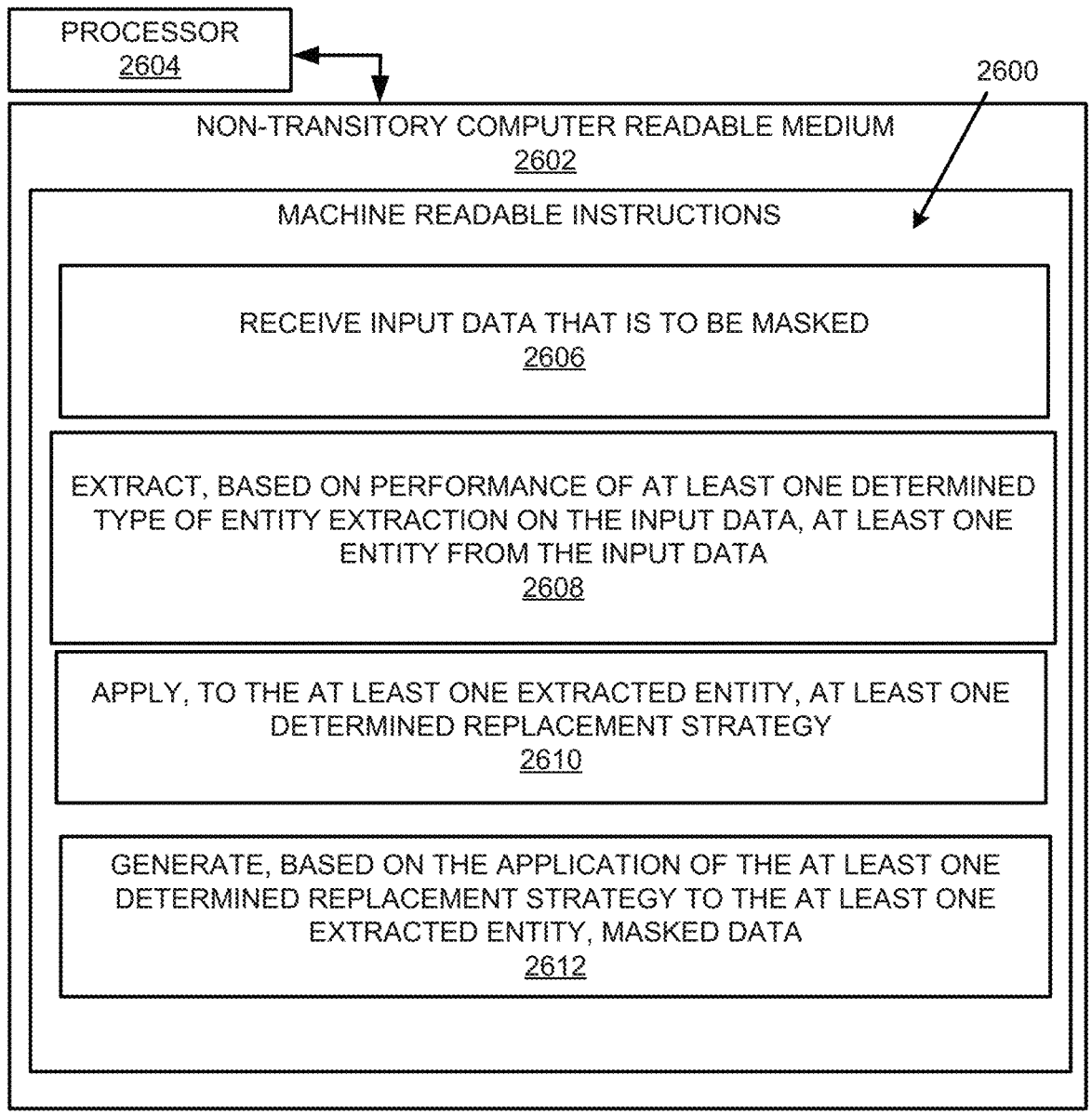
FIG. 26 illustrates a further example block diagram for machine learning and rule-based identification, anonymization, and de-anonymization of sensitive structured and unstructured data in accordance with another example of the present disclosure.

FIGS. 24-26 respectively illustrate an example block diagram 2400, a flowchart of an example method 2500, and a further example block diagram 2600 for machine learning and rule-based identification, anonymization, and de-anonymization of sensitive structured and unstructured data, according to examples. The block diagram 2400, the method 2500, and the block diagram 2600 may be implemented on the apparatus 100 described above with reference to FIG. 1 by way of example and not of limitation. The block diagram 2400, the method 2500, and the block diagram 2600 may be practiced in other apparatus. In addition to showing the block diagram 2400, FIG. 24 shows hardware of the apparatus 100 that may execute the instructions of the block diagram 2400. The hardware may include a processor 2402, and a memory 2404 storing machine readable instructions that when executed by the processor cause the processor to perform the instructions of the block diagram 2400. The memory 2404 may represent a non-transitory computer readable medium. FIG. 25 may represent an example method for machine learning and rule-based identification, anonymization, and de-anonymization of sensitive structured and unstructured data, and the steps of the method. FIG. 26 may represent a non-transitory computer readable medium 2602 having stored thereon machine readable instructions to provide machine learning and rule-based identification, anonymization, and de-anonymization of sensitive structured and unstructured data according to an example. The machine readable instructions, when executed, cause a processor 2604 to perform the instructions of the block diagram 2600 also shown in FIG. 26.

The processor 2402 of FIG. 24 and/or the processor 2604 of FIG. 26 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2602 of FIG. 26), such as hardware storage devices (e.g., RAM (random access memory), ROM (read only memory), EPROM (erasable, programmable ROM), EEPROM (electrically erasable, programmable ROM), hard drives, and flash memory). The memory 2404 may include a RAM, where the machine readable instructions and data for a processor may reside during runtime.

Referring to FIGS. 1-24, and particularly to the block diagram 2400 shown in FIG. 24, the memory 2404 may include instructions 2406 to receive input data 104 that is to be masked.

The processor 2402 may fetch, decode, and execute the instructions 2408 to determine, for the input data 104, at least one type of entity extraction 106 from a plurality of types of entity extractions 108 to be performed on the input data 104.

The processor 2402 may fetch, decode, and execute the instructions 2410 to perform, based on the at least one determined type of entity extraction 106, the at least one determined type of entity extraction 106 on the input data 104.

The processor 2402 may fetch, decode, and execute the instructions 2412 to extract, based on the performance of the at least one determined type of entity extraction 106 on the input data 104, at least one entity 110 from the input data 104.

The processor 2402 may fetch, decode, and execute the instructions 2414 to determine, for the at least one extracted entity 110, at least one replacement strategy 114 from a plurality of replacement strategies 116.

The processor 2402 may fetch, decode, and execute the instructions 2416 to apply, to the at least one extracted entity 110, the at least one determined replacement strategy 114.

The processor 2402 may fetch, decode, and execute the instructions 2418 to generate, based on the application of the at least one determined replacement strategy 114 to the at least one extracted entity 110, masked data 120.

Referring to FIGS. 1-23 and 25, and particularly FIG. 25, for the method 2500, at block 2502, the method may include receiving input data 104 that is to be masked.

At block 2504, the method may include determining, for the input data 104, at least one type of entity extraction 106 from a plurality of types of entity extractions 108 to be performed on the input data 104.

At block 2506, the method may include performing, based on the at least one determined type of entity extraction 106, the at least one determined type of entity extraction 106 on the input data 104.

At block 2508, the method may include extracting, based on the performance of the at least one determined type of entity extraction 106 on the input data 104, at least one entity 110 from the input data 104.

At block 2510, the method may include determining, for the at least one extracted entity 110, at least one replacement strategy 114 from a plurality of replacement strategies 116.

At block 2512, the method may include applying, to the at least one extracted entity 110, the at least one determined replacement strategy 114.

At block 2514, the method may include generating, based on the application of the at least one determined replacement strategy 114 to the at least one extracted entity 110, masked data 120.

Referring to FIGS. 1-23 and 26, and particularly FIG. 26, for the block diagram 2600, the non-transitory computer readable medium 2602 may include instructions 2606 to receive input data 104 that is to be masked.

The processor 2604 may fetch, decode, and execute the instructions 2608 to extract, based on performance of at least one determined type of entity extraction 106 on the input data 104, at least one entity 110 from the input data 104.

The processor 2604 may fetch, decode, and execute the instructions 2610 to apply, to the at least one extracted entity 110, at least one determined replacement strategy 114.

The processor 2604 may fetch, decode, and execute the instructions 2612 to generate, based on the application of the at least one determined replacement strategy 114 to the at least one extracted entity 110, masked data 120.

In some examples, entity resolution may be included with respect to FIG. 26. In this regard, if keywords are tagged with more than one entity type, disambiguation may be performed to resolve a conflict using context as disclosed herein with respect to FIG. 21.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A machine learning and rule-based identification, anonymization, and de-anonymization of sensitive structured and unstructured data apparatus comprising:
    an entity extractor, executed by at least one hardware processor, to
        receive input data that is to be masked,
        determine, for the input data, at least one type of entity extraction from a plurality of types of entity extractions to be performed on the input data,
        perform, based on the at least one determined type of entity extraction, the at least one determined type of entity extraction on the input data, and
        extract, based on the performance of the at least one determined type of entity extraction on the input data, at least one entity from the input data;
    a replacement strategy selector, executed by the at least one hardware processor, to
        determine, for the at least one extracted entity, at least one replacement strategy from a plurality of replacement strategies, and
        apply, to the at least one extracted entity, the at least one determined replacement strategy; and
    a masked data generator, executed by the at least one hardware processor, to
        automatically generate, based on the application of the at least one determined replacement strategy with a language dictionary to the at least one extracted entity, masked, custom training data for training at least one machine learning (ML) model; and
    automatically convert a file format of the masked, custom training data to a different file format than a file format of the input data.

2. The apparatus according to claim 1, wherein the input data includes at least one of a text format or an image format.

3. The apparatus according to claim 1, further comprising:
    a language translator, executed by the at least one hardware processor, to:
        detect a language of the input data;
        determine whether the detected language is different than a specified language; and
        based on a determination that the detected language is different than the specified language, translate the detected language to the specified language.

4. The apparatus according to claim 1, further comprising:
    an entity conflict resolver, executed by the at least one hardware processor, to:
        analyze the at least one extracted entity for a conflict with a plurality of labels associated with the at least one extracted entity; and
        generate, based on the analysis of the at least one extracted entity, a resolution to the conflict with the plurality of labels associated with the at least one extracted entity.

5. The apparatus according to claim 1, wherein the replacement strategy selector is executed by the at least one hardware processor to determine, for the at least one extracted entity, at least one replacement strategy from the plurality of replacement strategies by:
    determining, for the at least one extracted entity, at least one replacement strategy from the plurality of replacement strategies that include at least two of redaction, masking, pseudonymization, or encryption.

6. The apparatus according to claim 1, further comprising:
    an entity unmasker, executed by the at least one hardware processor, to
        receive further input data that is to be unmasked,
        determine, for the further input data, at least one type of entity to unmask from a plurality of types of entities to unmask, and
        generate, based on unmasking of the at least one determined type of entity to unmask, unmasked data.

7. The apparatus according to claim 1, wherein the entity extractor is executed by the at least one hardware processor to determine, for the input data, at least one type of entity extraction that includes a regular expression based entity extraction.

8. The apparatus according to claim 1, wherein the entity extractor is executed by the at least one hardware processor to determine, for the input data, at least one type of entity extraction that includes a language dictionary based entity extraction.

9. The apparatus according to claim 1, wherein the entity extractor is executed by the at least one hardware processor to determine, for the input data, at least one type of entity extraction that includes at least one of a named entity recognition based entity extraction and a custom blacklist based entity extraction.

10. The apparatus according to claim 1, wherein the entity extractor is executed by the at least one hardware processor to determine, for the input data, at least one type of entity extraction that includes a machine learning model based entity extraction.

11. A method for machine learning and rule-based identification, anonymization, and de-anonymization of sensitive structured and unstructured data, the method comprising:
    receiving, by at least one hardware processor, input data that is to be masked, wherein the input data includes at least one of a text format or an image format;
    determining, by the at least one hardware processor, for the input data, at least one type of entity extraction from a plurality of types of entity extractions to be performed on the input data;
    performing, by the at least one hardware processor, based on the at least one determined type of entity extraction, the at least one determined type of entity extraction on the input data;
    extracting, by the at least one hardware processor, based on the performance of the at least one determined type of entity extraction on the input data, at least one entity from the input data;
    determining, by the at least one hardware processor, for the at least one extracted entity, at least one replacement strategy from a plurality of replacement strategies;
    applying, by the at least one hardware processor, to the at least one extracted entity, the at least one determined replacement strategy; and
    automatically generating, by the at least one hardware processor, based on the application of the at least one determined replacement strategy with a language dictionary to the at least one extracted entity, masked, custom training data for training at least one machine learning (ML) model; and automatically convert a file format of the masked, custom training data to a different file format than a file format of the input data.

12. The method according to claim 11, further comprising:

detecting, by the at least one hardware processor, a language of the input data;

determining, by the at least one hardware processor, whether the detected language is different than a specified language; and based on a determination that the detected language is different than the specified language, translating, by the at least one hardware processor, the detected language to the specified language.

13. The method according to claim 11, further comprising:

analyzing, by the at least one hardware processor, the at least one extracted entity for a conflict with a plurality of labels associated with the at least one extracted entity; and generating, by the at least one hardware processor, based on the analysis of the at least one extracted entity, a resolution to the conflict with the plurality of labels associated with the at least one extracted entity.

14. The method according to claim 11, wherein determining, by the at least one hardware processor, for the at least one extracted entity, at least one replacement strategy from the plurality of replacement strategies further comprises:

determining, by the at least one hardware processor, for the at least one extracted entity, at least one replacement strategy from the plurality of replacement strategies that include at least two of redaction, masking, pseudonymization, or encryption.

15. The method according to claim 11, further comprising:

receiving, by the at least one hardware processor, further input data that is to be unmasked;

determining, by the at least one hardware processor, for the further input data, at least one type of entity to unmask from a plurality of types of entities to unmask; and generating, by the at least one hardware processor, based on unmasking of the at least one determined type of entity to unmask, unmasked data.

16. The method according to claim 11, wherein determining, for the input data, at least one type of entity extraction from the plurality of types of entity extractions further comprises:

determining, for the input data, at least one type of entity extraction from the plurality of types of entity extractions that include at least two of a regular expression based entity extraction, a language dictionary based entity extraction, a named entity recognition based entity extraction, a custom blacklist based entity extraction, or a machine learning model based entity extraction.

17. A non-transitory computer readable medium having stored thereon machine readable instructions, the machine readable instructions, when executed by at least one hardware processor, cause the at least one hardware processor to:

receive input data that is to be masked;

determine, for the input data, at least one type of entity extraction from a plurality of types of entity extractions to be performed on the input data;

perform, based on the at least one determined type of entity extraction, the at least one determined type of entity extraction on the input data;

extract, based on performance of at least one determined type of entity extraction on the input data, at least one entity from the input data;

determine, for the at least one extracted entity, at least one replacement strategy from a plurality of replacement strategies;

apply, to the at least one extracted entity, the at least one determined replacement strategy;

automatically generate, based on the application of the at least one determined replacement strategy with a language dictionary to the at least one extracted entity, masked custom training data for training at least one machine learning (ML) model; and automatically convert a file format of the masked, custom training data to a different file format than a file format of the input data.

18. The non-transitory computer readable medium according to claim 17, wherein the machine readable instructions, when executed by the at least one hardware processor, further cause the at least one hardware processor to:

analyze the at least one extracted entity for a conflict with a plurality of labels associated with the at least one extracted entity; and generate, based on the analysis of the at least one extracted entity, a resolution to the conflict with the plurality of labels associated with the at least one extracted entity.

19. The non-transitory computer readable medium according to claim 17, wherein the machine readable instructions, when executed by the at least one hardware processor, further cause the at least one hardware processor to:

determine, for the input data, at least one type of entity extraction from a plurality of types of entity extractions that include at least two of a regular expression based entity extraction, a language dictionary based entity extraction, a named entity recognition based entity extraction, a custom blacklist based entity extraction, or a machine learning model based entity extraction.

20. The non-transitory computer readable medium according to claim 17, wherein the language dictionary includes a custom dictionary of blacklist terms.

* * * * *